United States Patent
Hong

(10) Patent No.: US 12,114,336 B2
(45) Date of Patent: Oct. 8, 2024

(54) METHODS FOR PROCESSING MULTICAST/BROADCAST SERVICE DATA AND APPARATUSES THEREOF

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 219 days.

(21) Appl. No.: 17/172,376

(22) Filed: Feb. 10, 2021

(65) Prior Publication Data

US 2021/0258918 A1  Aug. 19, 2021

(30) Foreign Application Priority Data

Feb. 14, 2020 (KR) .................. 10-2020-0018413
Aug. 13, 2020 (KR) .................. 10-2020-0102012

(51) Int. Cl.
*H04H 20/71* (2008.01)
*H04W 72/30* (2023.01)

(52) U.S. Cl.
CPC .................. *H04W 72/30* (2023.01)

(58) Field of Classification Search
CPC ............ H04J 2203/0019; H04L 12/18; H04L 47/806; H04L 49/201; H04L 61/5069; H04L 65/611; H04L 2012/5642; H04N 21/6405; H04N 21/64; H04Q 2011/0047; H04Q 2213/242; H04W 4/06; H04W 72/005

See application file for complete search history.

(56) References Cited

U.S. PATENT DOCUMENTS 9,161,183 B2 * 10/2015 Mun ............... H04W 4/12
10,375,528 B2 * 8/2019 Kodaypak ............... H04W 4/06
11,375,527 B1 * 6/2022 Eyuboglu .......... H04B 7/15528
(Continued)

FOREIGN PATENT DOCUMENTS

CN 108366401 A 8/2018
CN 108924884 A 11/2018
(Continued)

OTHER PUBLICATIONS

Samsung, "Group communications with early E-RAB establishment", S2-134055, SA WG2 Meeting #100, Nov. 11-15, 2013, San Francisco, USA, pp. 1-9.
(Continued)

*Primary Examiner* — Shantell L Heiber
(74) *Attorney, Agent, or Firm* — IP Legal Services, LLC

(57) ABSTRACT

Provided are apparatus and method for processing MBS data. The method for receiving multicast/broadcast service (MBS) by a user equipment (UE) may include, when handover is determined, receiving, through a source base station, radio bearer configuration information for receiving MBS session data through a target base station, configuring (Continued)

a radio bearer for receiving the MBS session data through the target base station based on the radio bearer configuration information, and receiving the MBS session data through the radio bearer. The radio bearer configuration information is information generated by the target base station and transmitted to the source base station.

7 Claims, 17 Drawing Sheets

(56) References Cited

U.S. PATENT DOCUMENTS

| | | | |
|---|---|---|---|
| 2010/0080199 A1* | 4/2010 | Jim | H04L 47/27 370/498 |
| 2010/0261468 A1* | 10/2010 | Chun | H04W 76/27 455/422.1 |
| 2015/0365963 A1 | 12/2015 | Won et al. | |
| 2017/0181062 A1* | 6/2017 | Kim | H04W 72/30 |
| 2017/0257907 A1* | 9/2017 | Yu | H04W 8/005 |
| 2018/0213589 A1 | 7/2018 | Wu | |
| 2018/0248708 A1 | 8/2018 | Won et al. | |
| 2019/0306761 A1* | 10/2019 | Jin | H04W 76/11 |
| 2019/0379551 A1* | 12/2019 | Prasad | H04L 12/189 |
| 2020/0037214 A1 | 1/2020 | Jin et al. | |
| 2020/0128452 A1* | 4/2020 | Centonza | H04W 36/0044 |
| 2020/0137620 A1* | 4/2020 | Hsu | H04W 4/08 |
| 2021/0289402 A1* | 9/2021 | Ke | H04W 40/36 |

FOREIGN PATENT DOCUMENTS

| | | | | |
|---|---|---|---|---|
| EP | 2200367 A1 * | 6/2010 | | H04W 36/0072 |
| WO | 2017/095434 A1 | 6/2017 | | |

OTHER PUBLICATIONS

Qualcomm Incorporated, "Solution to KI7: Mobility between 5G MBS supporting and 5G MBS non-supporting NG RAN nodes", S2-2004223, SA WG2 Meeting #139E, Electronic meeting, Jun. 1-12, 2020.

ZTE, "KI#7, new solution multicast MBS session handover with Dummy QoS Flow", S2-2003962, SA WG2 Meeting #S2-139E, Jun. 1-12, 2020, Electronic, Elbonia.

Ericsson, "Mobility for NR MBS", R2-2007628, 3GPP TSG-RAN WG2 #111e, Electronic meeting, Aug. 17-28, 2020.

European Patent Office, European Search Report of corresponding EP Patent Application No. 21156931.4, Jul. 8, 2021.

The State Intellectual Property Office of People's Republic of China, Notice of Allowance of corresponding CN Patent Application No. 202110185284.6, Aug. 15, 2022.

* cited by examiner

FIG. 13

MBS radio bearer configuration information

```
MBS-RB ::=                      SEQUENCE {
    sdap-Config                         SDAP-Config
MBS-rb-Identity                 1,
    pdcp-Config                         PDCP-Config
}
SDAP-Config ::=                 SEQUENCE {
MBS-Session-Identity            10,
    mappedQoS-FlowsToAdd                SEQUENCE (QFI1, QFI2)
}
RLC-BearerConfig ::=                    SEQUENCE {
    logicalChannelIdentity                  11,
    MBS-rb-Identity                         1,
}
MBS-RB ::=                      SEQUENCE {
    sdap-Config                         SDAP-Config
MBS-rb-Identity                 2,
    pdcp-Config                         PDCP-Config
}
SDAP-Config ::=                 SEQUENCE {
  MBS-Session-Identity10,
    mappedQoS-FlowsToAdd                SEQUENCE (QFI3)
}
RLC-BearerConfig ::=                    SEQUENCE {
    logicalChannelIdentity                  12,
    MBS-rb-Identity                         2,
}
```

FIG.14

MBS radio bearer configuration information

```
MBS-RB ::=                      SEQUENCE {
    sdap-Config                         SDAP-Config
    MBS-rb-Identity             1,
    pdcp-Config                         PDCP-Config
}
SDAP-Config ::= {
MBS-Session ::=                 SEQUENCE {
    MBS-Session-Identity        10,
mappedQoS-FlowsToAdd            SEQUENCE (QFI1, QFI2)
}
RLC-BearerConfig ::=                    SEQUENCE {
    logicalChannelIdentity      11,
    MBS-rb-Identity             1,
}

MBS-RB ::=                      SEQUENCE {
    sdap-Config                         SDAP-Config
    MBS-rb-Identity             2,
    pdcp-Config                         PDCP-Config
}
SDAP-Config ::= {
MBS-Session ::=                 SEQUENCE {
    MBS-Session-Identity        10,
mappedQoS-FlowsToAdd            SEQUENCE (QFI1, QFI2)
}
RLC-BearerConfig ::=                    SEQUENCE {
    logicalChannelIdentity      12,
    MBS-rb-Identity             2,
}
```

METHODS FOR PROCESSING MULTICAST/BROADCAST SERVICE DATA AND APPARATUSES THEREOF

CROSS-REFERENCE TO RELATED APPLICATION

This application claims priority from Korean Patent Application Nos. 10-2020-0018413, filed on Feb. 14, 2020, and 10-2020-0102012, filed on Aug. 13, 2020, which are hereby incorporated by reference for all purposes as if fully set forth herein.

BACKGROUND

Field

The disclosure provides techniques related to processing multicast/broadcast service (MBS) data.

Description of Related Art

Cellular mobile communication networks have been mainly developed to provide end-to-end/point-to-point transmission services, but the development of broadband wireless transmission technologies and terminals (user equipment, UE) that provide various functions are leading to demand for various services. In particular, multimedia broadcast multicast services (MBMS) is a technology that may provide mobile broadcasting services using a cellular mobile communication network. Recently, various techniques are being developed to provide disaster relief communication services using enhanced MBMS (hereinafter, "eMBMS").

Unlike the end-to-end transmission service, MBMS is an end-to-many/point-to-multipoint transmission service and may advantageously increase the efficiency of use of radio resources by transmitting the same packet to multiple terminals within a single cell. Further, the MBMS service adopts a multi-cell transmission scheme in which a plurality of base stations simultaneously transmit the same packet, and use of such multi-cell transmission scheme allows the terminal receiving the service to obtain a diversity gain in the physical layer.

However, providing MBMS typically requires configuring dedicated entities (e.g., BM-SC, MBMS GW, or MCE) having specific functions. Accordingly, it is difficult to dynamically and flexibly provide unicast transmission and multicast transmission for various multicast/broadcast services.

Another issue that arises is the need for performing again the procedure of setting a multicast radio bearer after switching cells in a handover process to receive the MBMS service while the connected terminal is on the move.

BRIEF SUMMARY

The disclosure has been conceived from the above-described background and proposes techniques for flexibly providing a multicast/broadcast service (MBS) based on new radio (NR). The disclosure also proposes techniques for effectively providing MBS even while the UE is on the move.

According to an embodiment of the disclosure, a method may be provided for receiving multicast/broadcast service (MBS) by a user equipment (UE). The method may include, when handover is determined, receiving, through a source base station, radio bearer configuration information for receiving MBS session data through a target base station, configuring a radio bearer for receiving the MBS session data through the target base station based on the radio bearer configuration information; and receiving the MBS session data through the radio bearer. The radio bearer configuration information is information generated by the target base station and transmitted to the source base station.

According to an embodiment of the disclosure, a method may be provided for controlling, by a target base station, reception of multicast/broadcast service (MBS) data by a UE. The method may include receiving a handover request message including at least one of MBS session context information for the UE and PDU session context information associated with an MBS session from a source base station, generating radio bearer configuration information for the UE to receive MBS session data, and transmitting the radio bearer configuration information to the source base station.

According to an embodiment of the disclosure, a UE may be provided for receiving multicast/broadcast service (MBS) data. The UE may include a receiver receiving, through a source base station, radio bearer configuration information for receiving MBS session data through a target base station when handover is determined and a controller configuring a radio bearer for receiving the MBS session data through the target base station based on the radio bearer configuration information. The receiver further receives the MBS session data through the radio bearer. The radio bearer configuration information is information generated by the target base station and transmitted to the source base station.

According to an embodiment of the disclosure, a target base station may be provided for controlling reception of multicast/broadcast service (MBS) data by a UE. The target base station may include a receiver receiving at least one of a handover request message including MBS session context information for the UE and PDU session context information associated with an MBS session from a source base station, a controller generating radio bearer configuration information for receiving the UE's MBS session data, and a transmitter transmitting the radio bearer configuration information to the source base station.

Embodiments of the disclosure may flexibly provide a multicast/broadcast service (MBS) based on NR. Embodiments of the disclosure may effectively provide MBS even while the UE is on the move.

DESCRIPTION OF DRAWINGS

The above and other aspects, features, and advantages of the disclosure will be more apparent from the following detailed description taken in conjunction with the accompanying drawings, in which.

FIG. 13 is a view illustrating MBS radio bearer configuration information according to an embodiment.

FIG. 14 is a view illustrating MBS radio bearer configuration information according to another embodiment.

DETAILED DESCRIPTION

Figure 1:
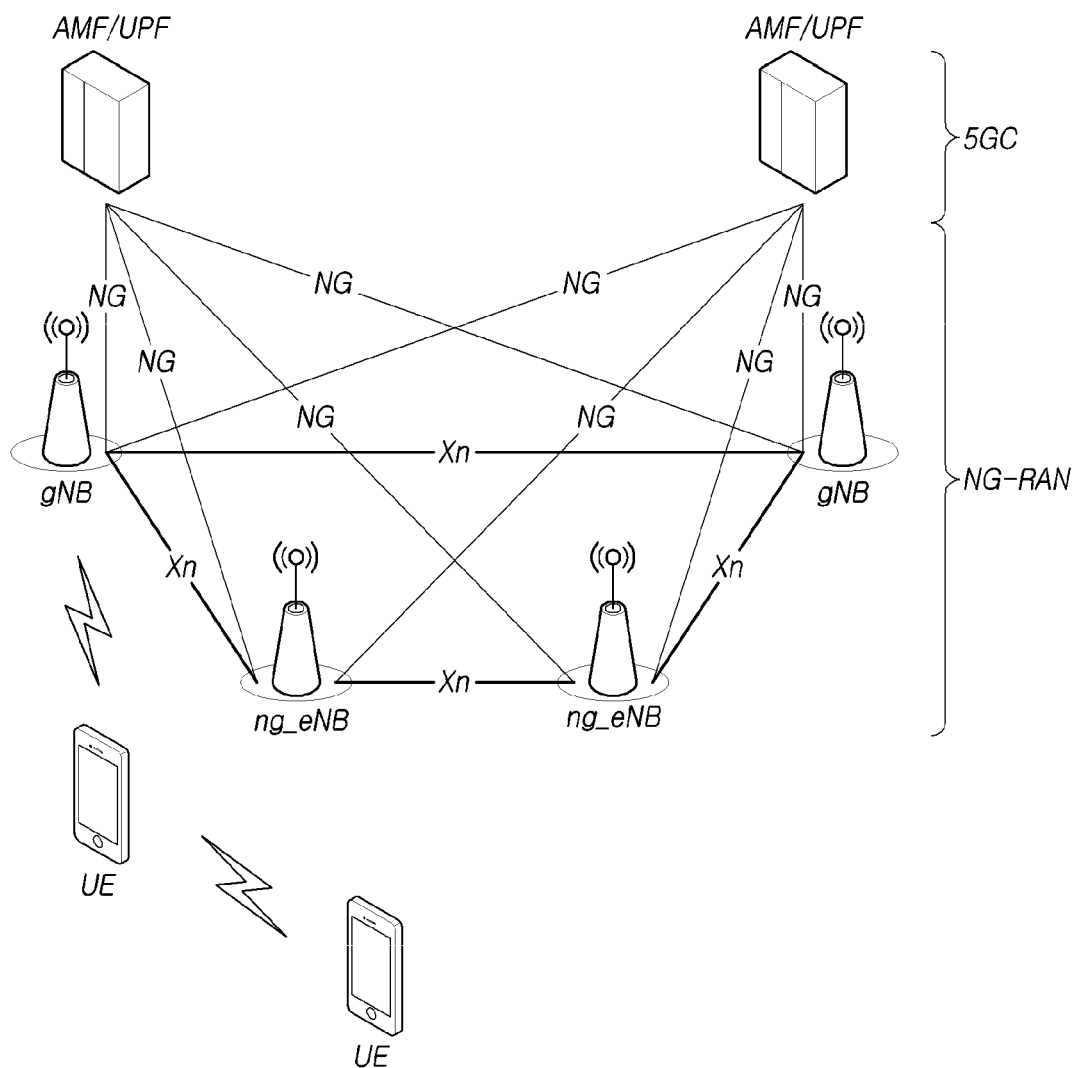
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "u" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
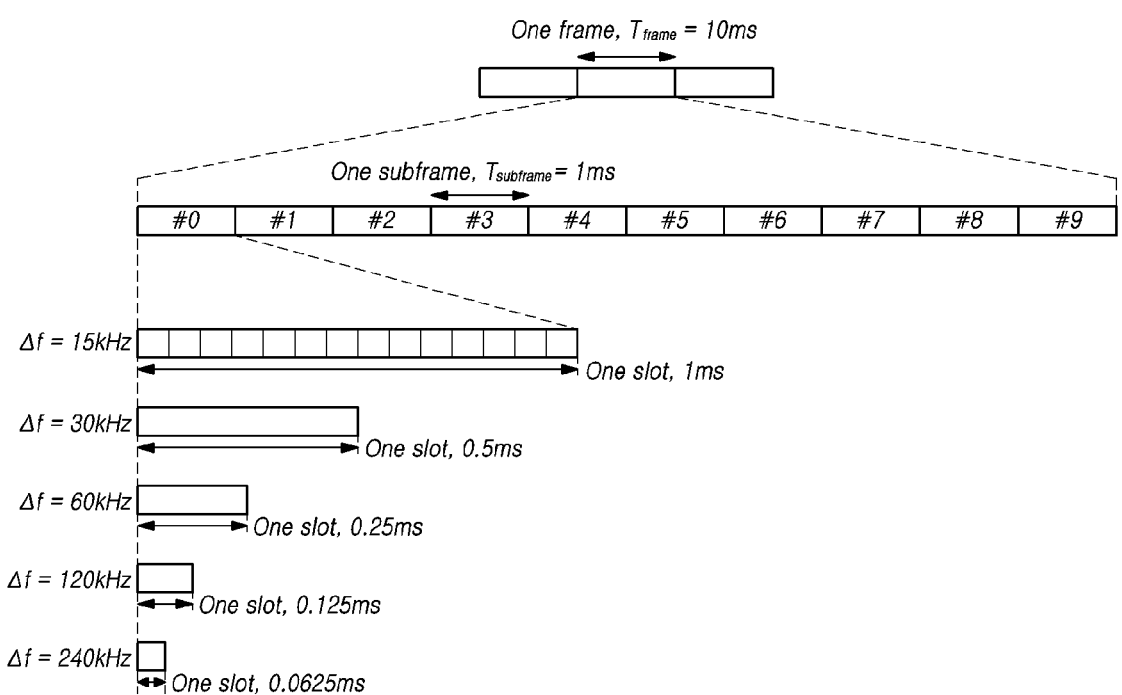
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 KHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
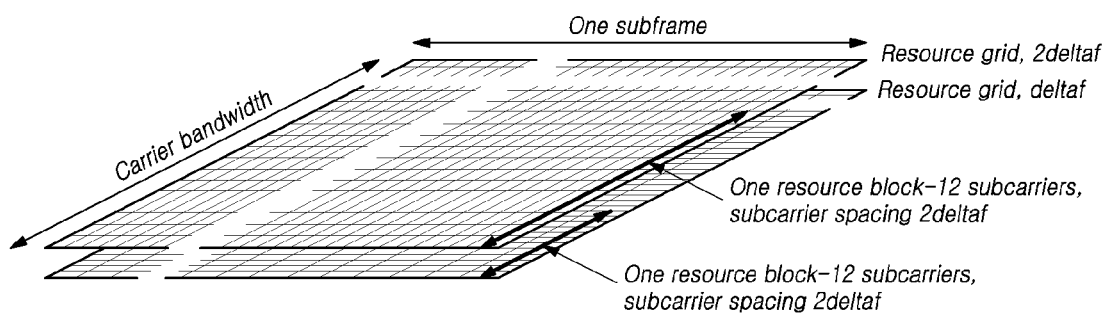
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
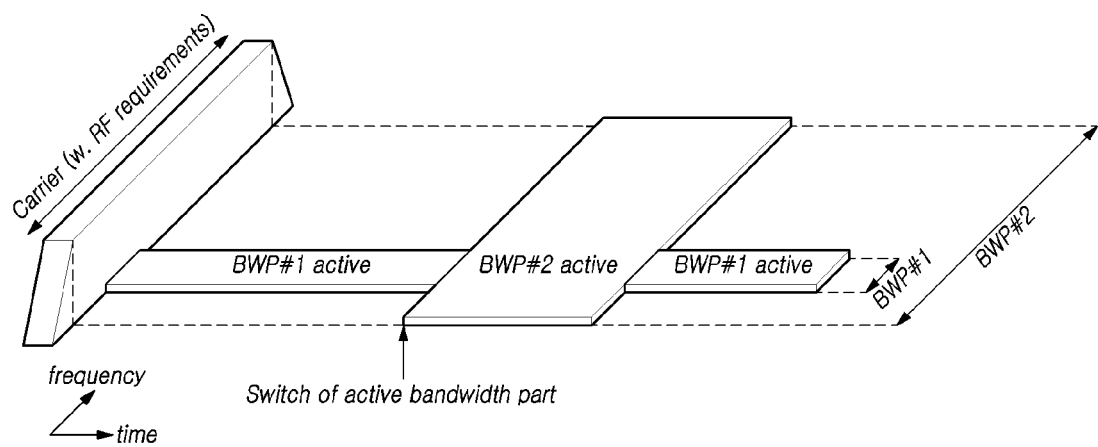
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHZ, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
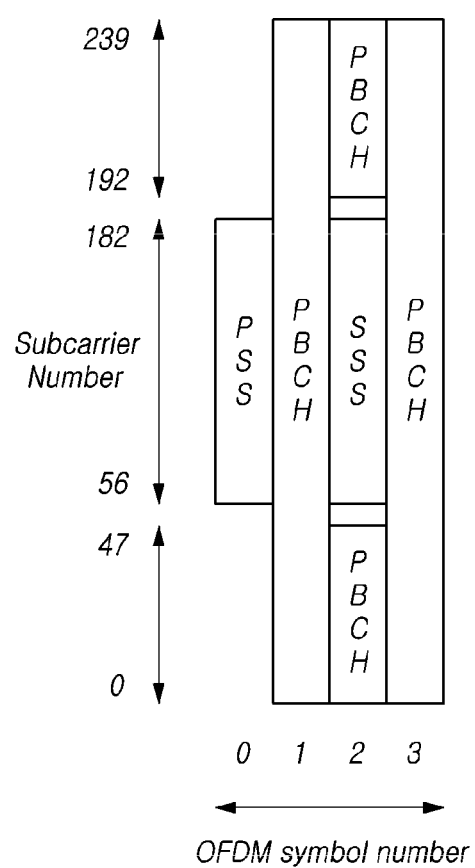
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
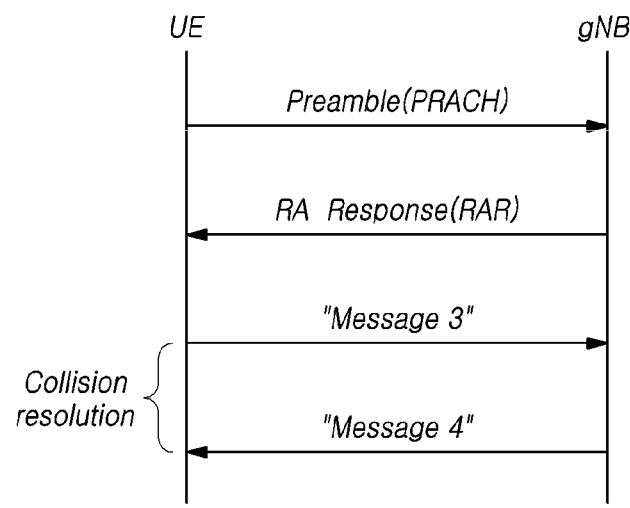
FIG. 6 is a signal diagram for explaining a random access procedure in a radio access technology in accordance with embodiments of the disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
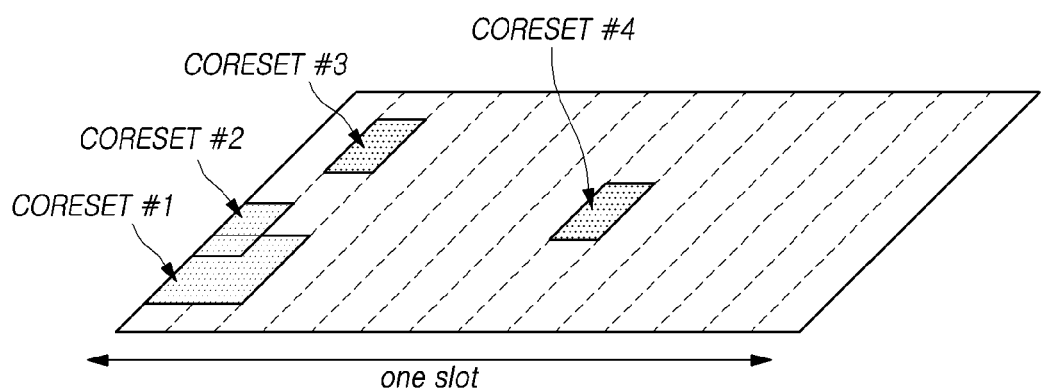
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

NR is a next-generation wireless communication technology that is being standardized in the 3GPP. That is, NR is radio access technology that may provide an enhanced data rate compared to LTE and may satisfy various QOS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. For example, each use scenario has different requirements in light of data rate, latency, reliability, and coverage. Therefore, as a method to efficiently satisfy the requirements for each usage scenario through the frequency band constituting an arbitrary NR system, it has been designed to efficiently multiplex radio resource units which are based on different numerologies (e.g., subcarrier spacing, subframe, TTI, etc.).

As an example, for the numerology which has different subcarrier spacing values, there are discussions about a method of multiplexing and supporting based on TDM, FDM, or TDM/FDM via one or more NR component carriers and a scheme for supporting one or more time units in configuring a scheduling unit in the time domain. In this regard, in NR, a subframe was defined as a type of time domain structure, and a 15 kHz SCS (Sub-Carrier Spacing) identical to LTE is configured as a reference numerology for defining a corresponding subframe duration. Therefore, a single subframe duration is defined which is constituted of 14 OFDM symbols of 15 kHz SCS-based normal CP overhead. That is, in NR, a subframe has a time duration of 1 ms. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, the latency requirements may be hard to meet. Thus, a mini-slot constituted of a smaller number of OFDM symbols than the slot constituted of 14 symbols may be defined and, based thereupon, scheduling capable of meeting the URLLC requirements may be carried out.

MBMS (Multimedia Broadcast Multicast Service) in LTE Network

The 3GPP, which develops mobile communication standards, has developed LTE broadcast/multicast standards for video broadcasting from Rel-9. Since then, standards have been specified to support other services, such as public safety, Internet of Things (IOT), and vehicle to everything (V2X), in LTE. For NR, which is currently being standardized, the Rel-15 and Rel-16 standards do not support MBMS. It is determined that MBMS-related standards should be further developed in the NR standard of the later release.

Meanwhile, in the LTE-based typical MBMS, two transmission schemes are provided: multimedia broadcast multicast service single frequency network (MBSFN) transmission; and single cell point to multipoint (SC-PTM) transmission.

The MBSFN transmission scheme is appropriate for providing media broadcasting in a large-scale pre-planned area (MBSFN area). The MBSFN area is statically configured. For example, this is configured by operation and maintenance (O&M). It may not be dynamically adjusted according to a user distribution. Synchronized MBMS transmission is provided within the MBSFN area, and combining is supported for MBMS transmission from a plurality of cells. Each MCH scheduling is performed by a multi-cell/multicast coordination Entity (MCE), and a single transport block is used for each TTI for MCH transmission. Further, the MCH transport block uses the MBSFN resource in the subframe. MTCH and MCCH may be multiplexed on the same MCH. MTCH and MCCH use the RLC-UM mode. Even if all radio resources are not used in the frequency domain, unicast and multiplexing are not allowed in the same subframe. As described above, the MBSFN transmission scheme is hard to dynamically adjust, and it is thus difficult to apply to small-scale broadcast services.

The SC-PTM transmission scheme was developed to enhance the inefficiency of the MBSFN transmission scheme. The MBMS is transmitted within single cell coverage. One SC-MCCH and one or more SC-MTCHs are mapped to the DL-SCH. Scheduling is provided by the base station. The SC-MCCH and SC-MTCH each are indicated by one logical channel-specific RNTI (SC-RNTI or G-RNTI) on the PDCCH. The SC-MTCH and SC-MCCH use the RLC-UM mode. Although single transmission is used for the DL-SCH to which the SC-MCCH and SC-MTCH are mapped, blind HARQ repetition or RLC repetition is not provided. Therefore, SC-PTM transmission may be unreliable.

Figure 8:
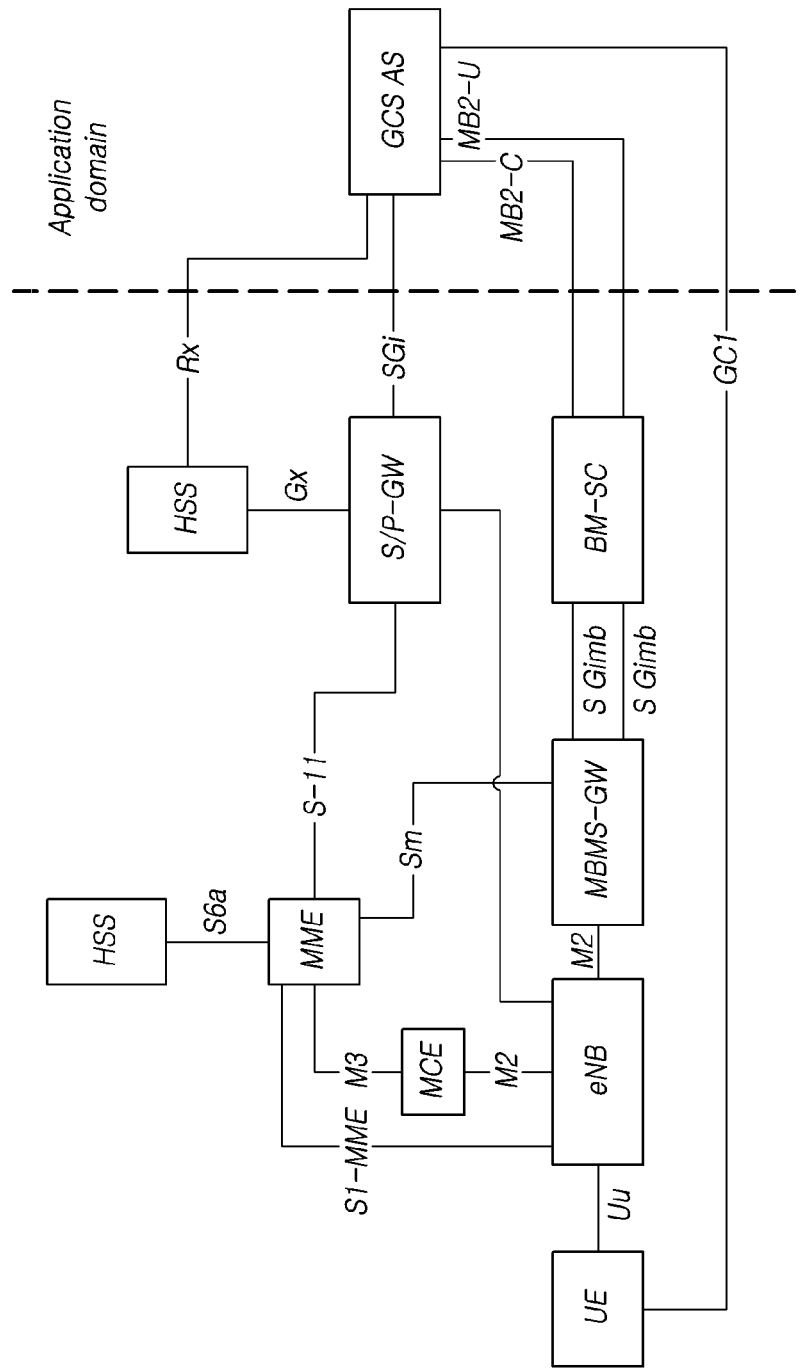
FIG. 8 is a view illustrating an example logical structure in MBMS.

To provide MBMS through the above-described transmission schemes, a logical structure as illustrated in FIG. 8 may be used.

FIG. 8 is a view illustrating an example logical structure in MBMS.

Referring to FIG. 8, each entity performs the following functions.

Group communication service application server (GCS AS) entity performs the following functions.
  performing a signaling exchange (e.g., service announcement) related to the GCS session and group management aspect with the UE.
  receiving uplink data from the UE through unicast.
  transmitting data to UEs belonging to one group using unicast delivery and/or multicast delivery.

Broadcast multicast-service centre (BM-SC) entity performs the following functions.
  operating as a source of MBMS transmission, and starting or stopping transmission of a session for the MBMS bearer service through MBMS session control signaling.

Multimedia broadcast/Multicast service gateway (MBMS GW) entity performs the following functions.
  the sending/broadcasting of MBMS packets to each eNB transmitting the service.
  the MBMS GW uses IP Multicast as the means of forwarding MBMS user data to the eNB.
  the MBMS GW performs MBMS Session Control Signalling (Session start/update/stop) towards the E-UTRAN via MME.

Multi-cell/multicast coordination entity (MCE) entity performs the following functions.
  the admission control and the allocation of the radio resources used by all eNBs in the MBSFN area for multi-cell MBMS transmissions using MBSFN operation.
  the MCE decides not to establish the radio bearer(s) of the new MBMS service(s) if the radio resources are not sufficient for the corresponding MBMS service(s) or may pre-empt radio resources from other radio bearer(s) of ongoing MBMS service(s) according to ARP.
  This determines additional details of the radio configuration in addition to the allocation of time/frequency radio resources. Besides allocation of the time/frequency radio resources this also may include deciding the further details of the radio configuration e.g. the modulation and coding scheme.
  deciding on whether to use SC-PTM or MBSFN.
  counting and acquisition of counting results for MBMS service(s).
  resumption of MBMS session(s) within MBSFN area(s) based on, e.g., the ARP and/or the counting results for the corresponding MBMS service(s).
  suspension of MBMS session(s) within MBSFN area(s) based e.g. the ARP and/or on the counting results for the corresponding MBMS service(s).

Figure 9:
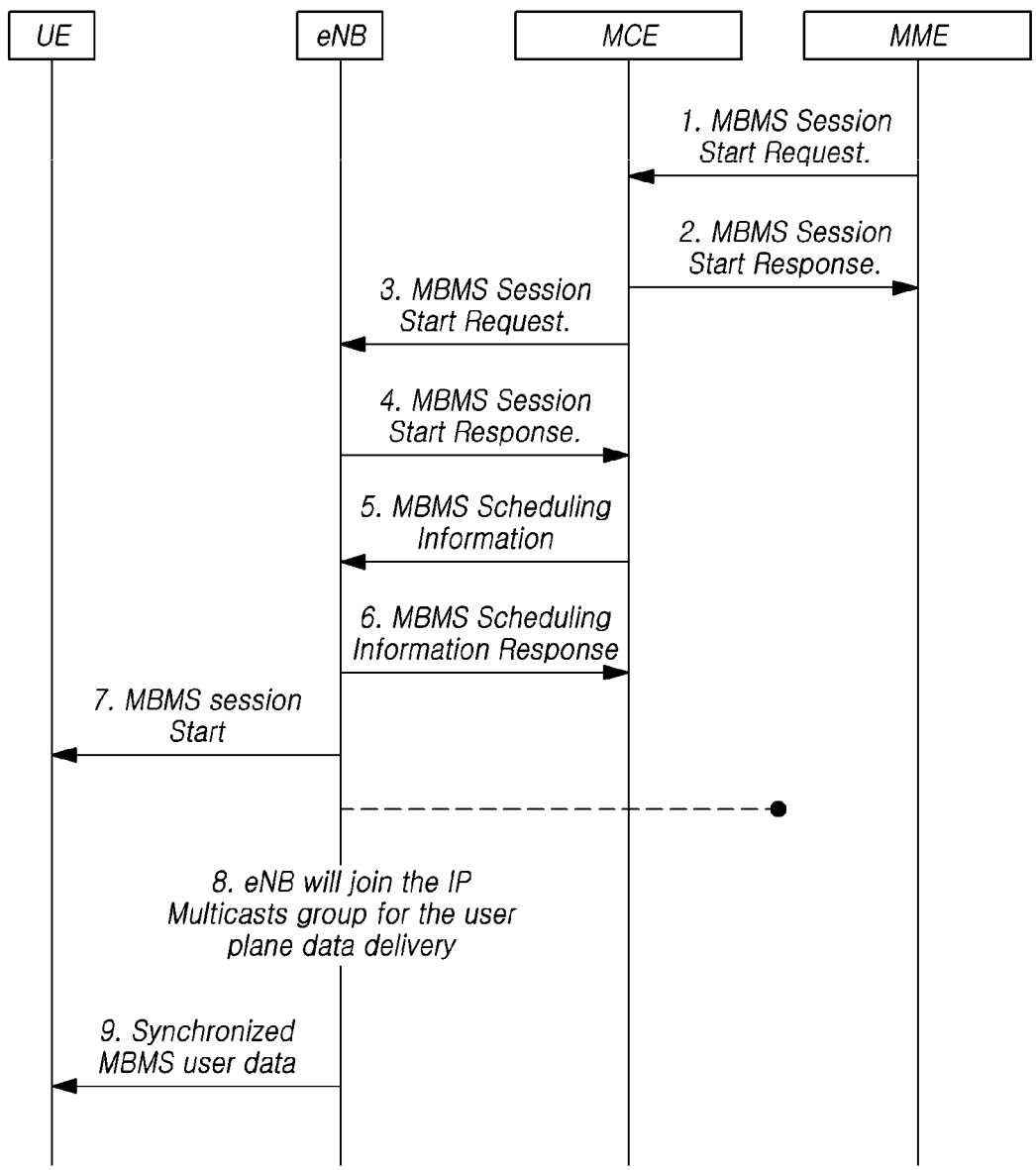
FIG. 9 is a view for describing a procedure for starting an MBMS session.

FIG. 9 is a view for describing a procedure for starting an MBMS session.

Referring to FIG. 9, an MBMS session is initiated through nine steps.

1. The MME sends MBMS session start request message to the MCE(s) controlling eNBs in the targeted MBMS service area. The message includes the IP multicast address, session attributes and the minimum time to wait before the first data delivery, and includes the list of cell identities if available.

2. The MCE decides whether to use SC-PTM or MBSFN to carry the MBMS bearer over the air interface.

The MCE confirms the reception of the MBMS Session Start request to the MME. This message can be transmitted before the step 4. In SC-PTM operation, the MCE only confirms the reception of the MBMS Session Start request to the MME, after the MCE receives at least one confirmation from the eNB(s) (i.e. Step 4).

3. In SC-PTM operation, the MCE may include the SC-PTM information, in the MBMS Session Start Request message to the relevant eNBs.

4. In SC-PTM operation, the eNB checks whether the radio resources are sufficient for the establishment of new MBMS service(s) in the area it controls. If not, eNB decides not to establish the radio bearers of the MBMS service(s), or may pre-empt radio resources from other radio bearer(s) according to ARP. eNB confirms the reception of the MBMS Session Start message.

Step 5 and 6 are only applicable to MBSFN operation.

5. MCE sends the MBMS Scheduling Information message to the eNB including the updated MCCH information which carries the MBMS service's configuration information. This message can be transmitted before the step 3.

6. eNB confirms the reception of the MBMS Scheduling Information message.

7. eNB indicates MBMS session start to UEs by MCCH change notification and updated MCCH information which carries the MBMS service's configuration information.

8. eNB joins the IP multicast group to receive the MBMS User Plane data.

9. eNB sends the MBMS data to radio interface.

As described, to provide MBMS, a complex control procedure was required between core network entities and radio network. For example, a separate MCE entity for controlling the base station within the target MBMS service area had to determine the transmission scheme of the MBSFN scheme and the SC-PTM scheme and perform the scheduling operation. Accordingly, it was difficult to dynamically turn on and off MBMS transmission for the cell to which a specific base station is associated. For example, even when there is only one UE that receives data through MBMS transmission in a specific cell, data must be transmitted inefficiently through MBMS transmission.

Method of Providing Service Continuity of Connected UE in LTE Network

In the LTE network, the radio bearer (e.g., MBMS radio bearer, SC-PTM radio bearer) establishment/setup procedure for MBMS data reception may be initiated, e.g., when starting an MBMS session (upon start of the MBMS session, upon (re-)entry of the corresponding MBSFN service area, upon entering a cell providing via SC-MRB a MBMS service in which the UE has interest, upon becoming interested in the MBMS service, upon removal of UE capability limitations inhibiting reception of the concerned service), and it may be applied through system information/MCCH/SC-MCCH message reception.

Therefore, when the connected UE moves, a procedure for controlling the handover of the UE in relation to MBMS reception is unnecessary. However, the RRC connected UE interested in receiving the MBMS service in the LTE network notifies the network of the MBMS interest information through an RRC message. When handover occurs according to the movement of the RRC connected UE, the source base station transmits the MBMS interest information for the UE to the target base station in the handover preparation process.

In RRC_CONNECTED, the UE that is receiving or interested to receive MBMS via MBSFN or SC-PTM informs the network about its MBMS interest via a RRC message and the network does its best to ensure that the UE is able to receive MBMS and unicast services subject to the UE's capabilities. In RRC_CONNECTED, the UE and the network perform the following operations.

- the UE indicates the frequencies which provide the service(s) that the UE is receiving or is interested to receive simultaneously, and which can be received simultaneously in accordance with the UE capabilities.
- if the PCell broadcasts SystemInformationBlockType 20, the UE also indicates the list of services that the UE is receiving or is interested to receive on the indicated frequencies.
- the UE indicates its MBMS interest at RRC connection establishment (the UE does not need to wait until AS security is activated), and whenever the set of frequencies on which the UE is interested in receiving MBMS services has changed compared with the last indication sent to the network (e.g. due to a change of user interest or of service availability), and whenever the list of MBMS services that the UE is interested in receiving has changed compared with the last indication sent to the network.
- the UE may only indicate its interest when the PCell provides SystemInformationBlockType 15 and after having acquired SystemInformationBlockType 15 of the current PCell.
- the UE may indicate its MBMS interest even if the current configured serving cell(s) do not prevent it from receiving the MBMS services it is interested in.
- for handover preparation, the source eNB transfers the MBMS interest of the UE, if available, to the target eNB. After handover, the UE reads SystemInformationBlockType 15 before updating its MBMS interest. If SystemInformationBlockType 15 is provided on the target cell but not on the source cell, the UE indicates its MBMS interest after handover.

As described above, in the related art, since dedicated entities (e.g., BM-SC, MBMS GW, MCE) having specific functions had to be configured to provide MBMS services, it was difficult to dynamically and flexibly provide unicast transmission and multicast transmission for various multicast/broadcast services. Accordingly, in order for the connected UE to receive the corresponding service, the procedure of setting the multicast radio bearer after switching cells during the handover process has to be performed again.

To address the foregoing issues, the disclosure provides methods and devices for flexibly controlling various NR-based multicast/broadcast services. In particular, the disclosure introduces methods and devices for effectively controlling handover when a UE receiving data through unicast moves to a cell providing an MBS service.

Described below are methods for providing a multicast/broadcast service (hereinafter, shortly "MBS") based on NR radio access technology and handover methods according to various embodiments of the present embodiment. However, this is for convenience of description, and the embodiments may be applied to any radio access technology. In the disclosure, information elements and operations specified in TS 38.331, which is the 3GPP NR RRC standard, are included, and a detailed descriptions thereof is omitted. Therefore, it is appreciated that although definitions of the corresponding information elements and relevant UE operations are not given herein, they may be appreciated.

The methods for providing an MBS service according to the disclosure are applicable not only to large-scale broadcasting services provided through a single frequency network (SFN), but also to any other services, such as V2X, public safety, IoT services, software upgrades, and file transfer as provided through one or more cells.

The embodiments described below may be applied individually or in any combination thereof.

Figure 10:
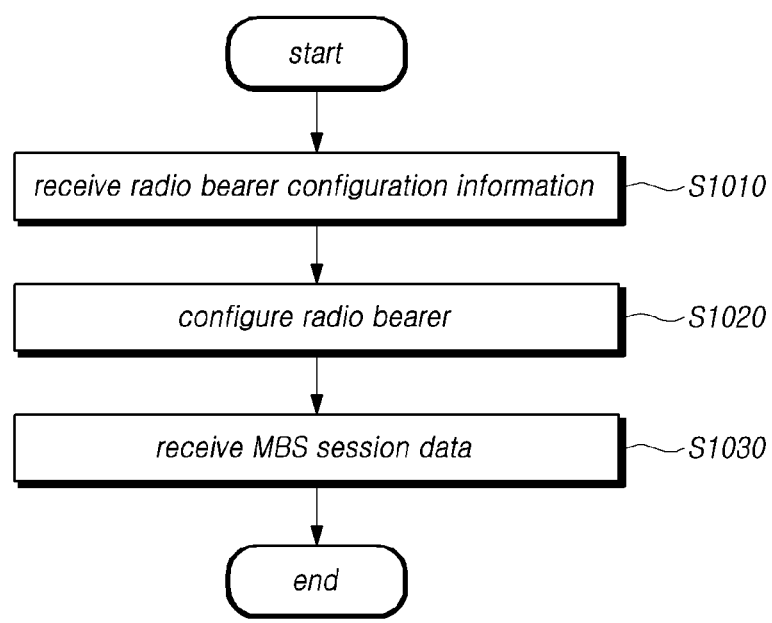
FIG. 10 is a view for describing operations of a UE according to an embodiment.

FIG. 10 is a flowchart for describing operations of a UE according to an embodiment.

Referring to FIG. 10, a method of receiving, through a source base station, multicast/broadcast service (MBS) data by a UE may include receiving radio bearer configuration information for receiving MBS session data through a target base station when handover is determined (S1010). For example, the radio bearer configuration information may be information generated by the target base station and transmitted to the source base station.

Meanwhile, the source base station may transmit a handover request message to the target base station. The handover request message may be various types of messages. For example, the handover request message may be a handover preparation request message. For example, the handover request message may include at least one of MBS session context information and PDU session context information associated with the MBS session.

The target base station identifies whether the target base station configures a corresponding MBS session context using the information received from the source base station.

As an example, when an MBS session context for MBS session data is not configured, the target base station transmits a message for requesting MBS session establishment/setup to the core network access and mobility management function (AMF) entity. For example, the target base station may send a request for MBS session resource user plane establishment to the core network AMF. The target base station receives a message to start an MBS session from the AMF entity. For example, the target base station may receive a request for MBS session resource configuration from the core network entity. As an example, the MBS session resource configuration may be requested by the core network entity, and the target base station may receive the request for MBS session resource configuration from the core network entity and configure the same. Therefore, the target base station may generate radio bearer configuration information. For example, the radio bearer may be a point-to-multipoint radio bearer for MBS data.

As another example, when no MBS session context for MBS session data is configured, the target base station may generate radio bearer configuration information using PDU session context information associated with the MBS session for MBS session data. For example, the radio bearer may be a point-to-point radio bearer for MBS data. For example, when the target base station does not support 5G MBS, a related PDU session may be established to configure a radio bearer.

Besides, the target base station may determine a transmission type for MBS session data. Further, the target base station may transmit a path switch request message requesting to switch the path of MBS session data to the core network access and mobility management function (AMF) entity. For example, the path switch request message may include MBS session context information.

The method for receiving the MBS data by the UE may include configuring a radio bearer for receiving MBS session data through the target base station based on radio bearer configuration information (S1020). When the UE receives radio bearer configuration information from the source base station, it is configured in the UE.

The method for receiving the MBS data by the UE may include receiving MBS session data through a radio bearer (S1030).

For example, the UE may receive MBS session data through a radio bearer mapped to the MBS session. As an example, the MBS session associated with MBS session data transmission and the radio bearer may be 1:N mapped. As another example, the MBS session associated with the MBS session data transmission and the radio bearer may be N:1 mapped and configured. Here, N is a natural number not less than 1. That is, one radio bearer and a plurality of MBS sessions may be mapped, or one MBS session and a plurality of radio bearers may be mapped. The radio bearer and the MBS session may be 1:1 mapped as well. For example, the radio bearer and MBS session mapping information may be included in the above-described radio bearer configuration information.

Through these operations, the UE may receive the MBS session data through the source base station and the target base station. Also possible is avoiding unnecessary operations for MBS session establishment.

Described below are operations from the viewpoint of the target base station in relation to the above-described operations.

Figure 11:
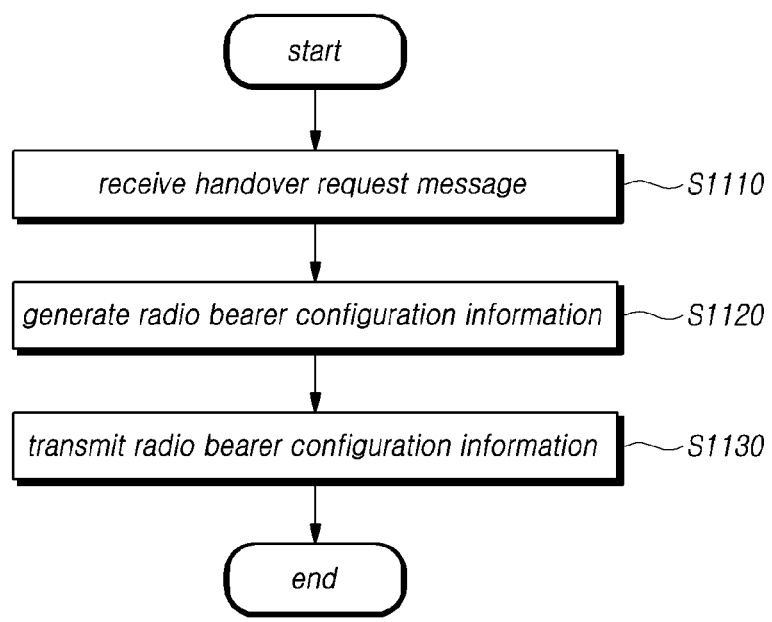
FIG. 11 is a view for describing operations of a target base station according to an embodiment.

FIG. 11 is a flowchart for describing operations of a target base station according to an embodiment.

Referring to FIG. 11, a method for controlling reception of MBS data of the UE by the target base station may include receiving a handover request message including at least one of MBS session context information for the UE and PDU session context information associated with the MBS session from the source base station (S1110).

The target base station may receive a handover request message from the source base station. The handover request message may be various types of messages. For example, the handover request message may be a handover preparation request message. For example, the handover preparation request message may include at least one of MBS session context information and PDU session context information associated with the MBS session.

The target base station identifies whether the target base station configures a corresponding MBS session context using the information received from the source base station.

The method for controlling reception of the MBS data of the UE by the target base station may include generating radio bearer configuration information for reception of the MBS session data of the UE (S1120).

As an example, generating radio bearer configuration information may further include, when no MBS session context for the MBS session data is configured in the target base station, transmitting a message for requesting an MBS session setup to the core network access and mobility management function (AMF) and receiving a message for starting the MBS session from the AMF entity. For example, the radio bearer may be a point-to-multipoint radio bearer for MBS data.

As another example, generating the radio bearer configuration information may include, when no MBS session context for MBS session data is configured in the target base station, generating radio bearer configuration information using the PDU session context information associated with the MBS session for MBS session data. For example, the radio bearer may be a point-to-point radio bearer for MBS data.

As another example, generating the radio bearer configuration information may include determining a transmission type for MBS session data.

The method for controlling reception of MBS data of the UE by the target base station may include transmitting radio bearer configuration information to the source base station (S1130).

As an example, the MBS session associated with MBS session data transmission and the radio bearer may be 1:N mapped. As another example, the MBS session associated with the MBS session data transmission and the radio bearer may be N:1 mapped and configured. Here, N is a natural number not less than 1. That is, one radio bearer and a plurality of MBS sessions may be mapped, or one MBS session and a plurality of radio bearers may be mapped. The radio bearer and the MBS session may be 1:1 mapped as well. For example, the radio bearer and MBS session mapping information may be included in the above-described radio bearer configuration information.

Further, the method for controlling reception of MBS data by the target base station may further include transmitting a path switch request message for requesting to switch the path of MBS session data to the core network access and mobility management function (AMF) entity. For example, the path switch request message may include MBS session context information.

Through the above operations, the target base station may efficiently provide the MBS session data received by the handover target UE.

The above-described operations of the UE, target base station, and source base station are described below in greater detail. Also described in detail are embodiments of MBS session data transmission/reception between the source base station and the UE. Each of the embodiments described below may be performed in a specific step by the above-described UE, target base station, or source base station. Alternatively, some of the above-described steps may be separated or may be added as separate steps. The embodiments described below may be performed in any combination.

An embodiment of transferring MBS session context information from a source base station to a target base station when a UE moves from a unicast transmission cell to a multicast/broadcast transmission cell To transmit MBS data (e.g., media, video, software downloading, etc.), an MBS session needs to be established between the UE and the core network entity. For convenience of description, the session between the multicast/broadcast receiving UE and the UPF (or any MBS user plane function having an interface between the application function for MBS service of the internal network or external network MBS application server) is denoted as an MBS session. This is merely for convenience of description and it may be replaced with any arbitrary term meaning a multicast/broadcast session between the UE and the UPF. Further, data through the MBS session is denoted as MBS data or MBS session data.

The MBS session may be a downlink-only one-way session. Alternatively, the MBS session may add an uplink session (or a bidirectional session) associated with the downlink session. Or, the MBS session may add a unicast session (e.g., PDU session) associated with the downlink session. The MBS session may be requested and established by UE initiation or network initiation.

MBS data may be transmitted transparently through the 5G system (5GS). This is because it is desirable to support MBS by recycling the existing structure of the 5G system as much as possible. To that end, the (MBS) application server of the external network may perform signaling with the control plane entity (e.g., AMF, SMF) of the 5G core network through a network exposure function (NEF) (or PCF). Or, the MBS function (which is a service center or application server for MBS and an entity/function for providing a signaling function for supporting the same. This is denoted as an MBS service function for ease of description and may be replaced with a different term) of the core network or application function (AF) (for MBS service) of the core network may perform signaling with a control plane entity (e.g., AMF or SMF) of the 5G core network through the policy control function (PCF).

The external network application server may transmit MBS data to the base station through UPF (or MBS UPF). Alternatively, the application function (AF) of the core network or the MBS function of the core network may transmit MBS data to the base station through UPF (or MBS UPF).

In providing an MBS service, the more users who receive the corresponding MBS session are within the coverage of one cell, the higher the transmission efficiency of multicast/broadcast delivery of the MBS session may be. In contrast, as the number of users receiving the MBS session within the cell coverage reduces, the transmission efficiency of multicast/broadcast delivery may be lowered as compared with unicast transmission. In other words, the wireless transmission efficiency of the MBS session is reduced as compared with unicast-based transmission for supporting data reception by multiple users. In this sense, it may be needed to transmit MBS data in the multicast/broadcast scheme in some cells while transmitting MBS data in the unicast scheme in other cells, for one MBS service. Methods for transmitting MBS data is described below.

When the RRC connected UE is receiving MBS data in the unicast scheme in one cell, a cell switch may occur as the UE moves. In this case, the target cell to which the UE hands over may be transmitting the MBS data in the multicast/unicast scheme. In this situation, coordination between the source base station and the target base station is required to minimize service interruption for the MBS data being received.

For example, the source base station may include information on the MBS session, which the UE is receiving in the unicast scheme, in the handover request message or the handover preparation information message (HandoverPreparationInformation RRC container, inter-node RRC message) included in the handover request message and transmit the same. For convenience of description, the information on the MBS session being received by the UE is denoted as MBS context information. This is merely for convenience of description and it may be replaced with any other term.

The MBS context information may include one or more of MBS session information, QOS flow information included in the MBS session, transport network layer (TNL) information, MBS data transmission/cast type in the base station/cell associated with the base station, cell identification information, base station identification information, identification information on the UE receiving the MBS data, one multicast address (e.g., IP multicast address), and the number of UE(s) joining the MBS session. The MBS session information may include at least one of the MBS service ID, MBS session ID, TMGI, session-ID, IP multicast address, slice information (e.g., S-NSSAI) associated with the MBS session, MBS service area identifier, and MBS service cell identification information. The QoS flow information may include one or more of QoS information on the MBS session (e.g. 5QI/QCI, QoS flow Identifier, GBR QOS flow information (Maximum Flow Bit Rate, Guaranteed Flow Bit Rate, Maximum Packet Loss Rate), Allocation and Retention Priority, Priority Level Packet Delay Budget and Packet Error Rate). The TNL information may include one of an IP multicast address, an IP source address, and a GTP DL TEID. The identification information on the UE receiving the MBS data may be at least one of C-RNTI, 5G-S-TMSI, I-RNTI, SUCI (Subscription Concealed Identifier)/SUPI (Subscription Permanent Identifier), and 5G-GUTI.

For example, the MBS context information may be divided using information (e.g., MBS session information) for identifying the MBS session. As another example, the MBS context information may be allocated as information that is distinguished from the information for identifying the MBS session. The MBS context information may be associated with the information for identifying the MBS session. For example, the MBS context identification information may be allocated by one of the base station or UPF or AMF/SMF.

As another example, if the MBS context information is included in the handover preparation information message, it will be defined as a new information element that is distinguished from the information elements (e.g., AS-Config, AS-Contex) included in the typical handover preparation information message. Alternatively, the MBS context information may be included in the AS configuration (AS-Config) information element or an AS context (AS-Contex) information element included in the typical handover preparation information message.

One or more pieces of the above-described information may be directly included in the handover request message as an information element, and one or more other pieces of information may be included in the handover preparation information message. That is, the above-described information may be divided and included in two or more messages.

The above-described embodiment may also be applied when moving from a unicast transmission cell to another unicast transmission cell. For example, when the RRC connected UE is receiving MBS data in the unicast scheme in one cell, a cell switch may occur as the UE moves. In this case, the target cell to which the UE is handed over may also be in a state in which multicast/broadcast transmission is not performed for the corresponding MBS session. Even in this case, the above-described embodiment may apply.

Meanwhile, a multicast/broadcast (point-to-multipoint) radio bearer for a specific MBS session may be mapped to a unicast (point-to-point) radio bearer through inter-base station coordination and configured in the UE. By so doing, the UE may receive data for the MBS session through the unicast radio bearer at (or after) a specific time. The specific time may be one of the times of reception of an RRC message including a handover command, initiation of random access to the target base station (Msg1/MsgA transmission), any first/initial uplink transmission to the target base station, successful random access to the target base station, release of the source cell, application/establishment/reconfiguration/completion of any L2 entity in the target cell, and completion of handover.

An embodiment in which the target base station transmits, e.g., information indicating whether to transmit via multicast/unicast for a corresponding MBS session, to the source base station The target base station prepares for a handover having an L1/L2 configuration. The target base station may perform accept control on the received MBS session/MBS context. The target base station may transmit information indicating whether to transmit via multicast/broadcast for the corresponding MBS session to the source base station. Or, the target base station may transmit information for indicating that any function (e.g., maintaining the source cell) for reducing service suspension for the MBS session has applied.

As an example, the target base station may determine whether to accept transmission in any transmission scheme/cast type (e.g., multicast/broadcast transmission, unicast transmission) for the corresponding MBS session requested by the source base station for the corresponding UE. As another example, the target base station may directly determine a transmission scheme/cast type (e.g., multicast/broadcast transmission, unicast transmission) for the corresponding MBS session requested by the source base station for the corresponding UE. As another example, the target base station may indicate to the source base station a transmission scheme/cast type for the corresponding MBS session requested by the source base station for the corresponding UE. As another example, if the target base station is performing multicast/broadcast transmission for the corresponding MBS session, the target base station may indicate to the source base station that multicast/broadcast transmission is performed for the corresponding MBS session.

As another example, the target base station may transmit the accepted MBS session resource information (MBS Session Resource Admitted List) to the source base station. The information may include one or more of the MBS session identification information, MBS session context information, TNL information, accepted QoS flow information, and target base station data forwarding information (e.g., DL data forwarding GTP-TEID). As another example, the information may be transmitted from the target base station to the source base station through a handover request acknowledge (HANDOVER REQUEST ACKNOWLEDGE) message. For example, the aforementioned MBS session resource information may be included in the radio bearer configuration information and transmitted.

Meanwhile, the RRC connected UE receiving data for a specific MBS session may receive MBS data through the source cell during cell switch.

For example, the UE may receive data for the corresponding MBS session through the source cell through a multicast/broadcast radio bearer until a specific time. Here, the specific time may be one of the times of reception of an RRC message including a handover command, initiation of the procedure of access to the target base station (Msg1/MsgA transmission), any first/initial transmission to the target base station, successful random access to the target base station, release of the source cell, application/establishment/reconfiguration/completeness of any L2 entity/configuration in the target cell, completeness of handover, and reception of system information and/or control information (e.g., RRC message or control logic channel for the MBS session, such as MCCH or SC-MCCH) for the MBS session in the target cell.

As another example, the UE may receive data for the corresponding MBS session through the source cell through a unicast radio bearer until a specific time. Here, the specific time may be one of the times of reception of an RRC message including a handover command, any first/initial transmission to the target base station, successful random access to the target base station, release of the source cell, application/establishment/reconfiguration/completeness of any L2 entity/configuration in the target cell, completeness of handover, and reception of system information or control information (e.g., RRC message belonging to the control logic channel for a similar MBS session, such as MCCH or SC-MCCH) for the MBS session in the target cell.

Alternatively, after receiving the RRC message for handover, the UE may complete successful random access to the target base station and maintain the connection to the source base station until the source cell is released. Alternatively, after receiving the RRC message for handover, the UE may maintain connection to the source base station until the first/initial uplink transmission to the target base station. Such information for instructing to maintain connection of the UE may be transmitted from the source base station to the target base station. The information for instructing to maintain connection of the UE may be transmitted from the target base station to the source base station. The information for instructing to maintain connection of the UE may be transmitted from the target base station to the UE.

An embodiment of performing MBS session data forwarding from source base station to target base station The source base station may propose/request data forwarding for the QoS flow of each MBS session through the above-described handover request message. When the target base station accepts data forwarding for at least one QoS flow for the MBS session, the target base station may transmit the downlink TNL information on the QoS flow which belongs to the MBS session to the source base station through a handover request acknowledge (HANDOVER REQUEST ACKNOWLEDGE) message.

If the MBS radio bearer is configured without a PDCP entity, the packets of the QoS flow belonging to the corresponding MBS session may be forwarded through the DL (MBS radio bearer) forwarding tunnel mapped as RLC SDUs.

The source base station may receive a GTP-U end marker for the corresponding MBS session from the UPF (or MBS UPF). When data for any more MBS sessions is not forwarded through the tunnel, the received end marker may be transmitted (replicated) through each data forwarding tunnel. This operation may be performed as the source base station performs a procedure (which is described below) for transmitting a message for instructing/requesting to modify/release the DL tunnel between the base station and the UPF associated with the MBS session to the AMF/SMF.

A unidirectional UM mode RLC entity without PDCP may be used to perform multicast/broadcast data transmission on the air interface between the base station and the UE. Even when unicast transmission is performed on the MBS session, the SDAP entity may be directly associated to the RLC entity, without PDCP. The base station may indicate to the UE configuration information for indicating such entity association.

As another example, a unidirectional UM mode RLC entity including a PDCP may be used to perform multicast/broadcast data transmission on the radio interface between the base station and the UE. When performing unicast transmission on the MBS session, the SDAP is associated with the PDCP entity and the PDCP entity is associated with the RLC entity.

As another example, an AM mode RLC entity including a PDCP may be used to perform multicast/broadcast data transmission on the radio interface between the base station and the UE. When performing unicast transmission on the MBS session, the SDAP is associated with the PDCP entity and the PDCP entity is associated with the RLC entity.

When Using RLC UM Mode without PDCP

When the unicast radio bearer for the MBS session uses the PDCP-less UM mode RLC entity in the source base station transmitting MBS data via unicast, the target base station transmitting the MBS session via multicast/broadcast may perform handover using the PDCP-less UM mode RLC entity. Since there is no PDCP entity, the target base station does not need to reset the PDCP SN or SFN or retransmit the PDCP SDUs.

As another example, when the UE moves from a unicast transmission cell to another unicast transmission cell, if the unicast radio bearer for the MBS session uses the PDCP-less UM mode RLC entity in the source base station transmitting the MBS data via unicast, the target base station transmitting the MBS session via unicast may perform handover using the PDCP-less UM mode RLC entity. Since there is no PDCP entity, the target base station does not need to reset the PDCP SN or SFN or retransmit the PDCP SDUs.

Meanwhile, radio bearer configuration information for the MBS session where the target base station performs transmission may be indicated to the UE. The target base station includes the radio bearer configuration information for the corresponding MBS session in an RRC dedicated message (e.g., RRC Reconfiguration message) and transmits the same to the UE. Alternatively, the radio bearer configuration information may be transmitted to the UE through the source base station.

The UE may maintain/reconfigure the RLC entity to receive the RLC SDUs forwarded from the source base station to the target base station. When the reception of the forwarded RLC SDUs is completed, the UE may cancel/modify/reset the same. To that end, an end marker may be included in the RLC SDUs. This may be transmitted through the RLC control PDU. Or, it may be transmitted as an RLC data PDU including a header in a specific format. Alternatively, it may be transmitted as arbitrary L2/L3 user plane data (e.g., RLC SDU) including a header in a specific format. Or, it may be transmitted as arbitrary L2/L3 control plane data including a header in a specific format.

And/or the UE may reconfigure an RLC entity to receive the RLC SDUs forwarded from the target base station. The target base station may transmit/retransmit all downlink data forwarded by the source base station. As another example, when the UE moves from a unicast transmission cell to a multicast/broadcast transmission cell as well as from a unicast transmission cell to another unicast transmission cell, RLC sequence number (SN) for duplicate avoidance and in-sequence delivery may be maintained for each radio bearer (unicast radio bearer and/or MBS radio bearer) for MBS. The source base station may inform the target base station of the next DL RLC SN to be allocated to a packet that does not yet have an RLC SN. For example, the notification information may be included in the handover request message.

When Using RLC UM Mode Including PDCP

When the unicast radio bearer for the MBS session uses the PDCP-containing UM mode RLC entity in the source base station transmitting MBS data via unicast, the target base station transmitting the MBS session via multicast/broadcast may perform handover using the PDCP-containing UM mode RLC entity. The target base station resets the PDCP SN or SFN. Retransmission of PDCP SDUs is not required.

As another example, when the UE moves from a unicast transmission cell to another unicast transmission cell, if the unicast radio bearer for the MBS session uses the PDCP-containing UM mode RLC entity in the source base station transmitting the MBS data via unicast, the target base station transmitting the MBS session via unicast may perform handover using the PDCP-containing UM mode RLC entity. The target base station resets the PDCP SN or SFN. Retransmission of PDCP SDUs is not required.

Radio bearer configuration information for the MBS session where the target base station performs transmission may be indicated to the UE. The target base station includes the radio bearer configuration information for the corresponding MBS session in an RRC dedicated message (e.g., RRC Reconfiguration message) and transmits the same to the UE. Alternatively, the radio bearer configuration information may be transmitted to the UE through the target base station.

The UE may maintain/reconfigure the PDCP entity to receive the PDCP SDUs forwarded from the source base station to the target base station. When the reception of the forwarded PDCP SDUs is completed, the UE may cancel/modify/reset the same. To that end, an end marker may be included in the PDCP SDUs. This may be transmitted through the PDCP control PDU. Or, it may be transmitted as an PDCP data PDU including a header in a specific format. Alternatively, it may be transmitted as arbitrary L2/L3 user plane data (e.g., PDCP SDU) including a header in a specific format. Or, it may be transmitted as arbitrary L2/L3 control plane data including a header in a specific format.

And/or the UE may reconfigure an PDCP entity to receive the PDCP SDUs forwarded from the target base station. The target base station may transmit/retransmit all downlink data forwarded by the source base station. As another example, when the UE moves from a unicast transmission cell to a multicast/broadcast transmission cell as well as from a unicast transmission cell to another unicast transmission cell, PDCP sequence number (SN) for duplicate avoidance and in-sequence delivery may be maintained for each radio bearer (unicast radio bearer and/or MBS radio bearer) for MBS. The source base station may inform the target base station of the next DL RLC SN to be allocated to a packet that does not yet have an PDCP SN. For example, the notification may be included in the handover request message and transmitted. As another example, the notification may be included in the SN STATUS message and transmitted.

When Using RLC AM Mode Including PDCP

When the unicast radio bearer for the MBS session uses the PDCP-containing AM mode RLC entity in the source base station transmitting MBS data via unicast, the target base station transmitting the MBS session via multicast/broadcast may perform handover using the PDCP-containing AM mode RLC entity. The target base station may maintain/reconfigure the PDCP entity to receive the PDCP SDUs forwarded from the source base station, in sequence or without loss.

As another example, when the UE moves from a unicast transmission cell to another unicast transmission cell, if the unicast radio bearer for the MBS session uses the PDCP-containing AM mode RLC entity in the source base station transmitting the MBS data via unicast, the target base station transmitting the MBS session via unicast may perform handover using the PDCP-containing AM mode RLC entity. Radio bearer configuration information for the MBS session where the target base station performs transmission may be indicated to the UE. The target base station includes the radio bearer configuration information for the corresponding MBS session in an RRC dedicated message (e.g., RRC Reconfiguration message) and transmits the same to the UE.

Alternatively, the radio bearer configuration information may be transmitted to the UE through the source base station.

The UE may maintain/reconfigure the PDCP entity to receive the PDCP SDUs forwarded from the source base station to the target base station. And/or the UE may reconfigure an PDCP entity to receive the PDCP SDUs forwarded from the target base station. As another example, when the UE moves from a unicast transmission cell to a multicast/broadcast transmission cell as well as from a unicast transmission cell to another unicast transmission cell, PDCP sequence number (SN) for duplicate avoidance and in-sequence delivery may be maintained for each radio bearer (unicast radio bearer and/or MBS radio bearer) for MBS. The source base station may inform the target base station of the next DL RLC SN to be allocated to a packet that does not yet have an PDCP SN. For example, the notification may be included in the handover request message and transmitted by the source base station. As another example, the notification may be included in the SN STATUS message and transmitted.

The target base station may transmit/retransmit all downlink data forwarded by the source base station. The target base station retransmits all downlink PDCP SDUs starting from the oldest PDCP SDU that has not been identified by RLC in the source base station. To that end, the source base station may transmit the unidentified SN to the target base station.

An embodiment of instructing/requesting to modify/release a DL tunnel between the base station and UPF associated with the MBS session from the source base station to the AMF/SMF The UE completes the RRC handover procedure by synchronizing to the target cell and transmitting an RRC reconfiguration complete (RRCReconfigurationComplete) message to the target base station.

If the target base station has already established a DL tunnel between the base station and the UPF (or MBS UPF) associated for the MBS session and is performing multicast/broadcast transmission, or if the target base station has already established a DL tunnel between the base station and the UPF associated for the MBS session and is performing unicast transmission on another UE, the target base station need not perform a path switching (Path switch request) procedure. It may only be necessary to release the transmission path of the source base station. If a DL tunnel has already been established between the base station and the UPF associated for the MBS session, the target base station may transmit MBS data in association with/using the same.

The target base station may identify the corresponding MBS session through the MBS session information/MBS context information received from the source base station. The target base station may add/modify/store the already established DL tunnel information between the UPF and the base station in the MBS context information for the corresponding UE. Or, the target base station may associate the already established DL tunnel between the UPF and the base station to the MBS context information for the UE. Alternatively, the target base station may add/modify/store the UE-related information in the MBS context information.

The target base station may transmit information for instructing to release/modify/change the DL tunnel between the UPF and the base station to the source base station. For example, the target base station may transmit information for instructing to release/modify/change the DL tunnel between the base station and the UPF for the MBS session through the UE context release message. Alternatively, the target base station may transmit information for such instruction through an arbitrary Xn interface message. The messages may include one or more of the information exemplified in each embodiment, such as MBS session information/MBS session context information, cast type, and TNL information between the UPF and the source base station.

The source base station may transmit information for instructing to release/modify/change the DL tunnel between the UPF and the base station to the AMF/SMF. It may be provided by including the information in a typical PATH SWITCH request message and transmitting the same. As another example, it may be transmitted through a message between the base station and the AMF/SMF interface that is different from the PATH SWITCH request message. The messages may include one or more of the information exemplified in each embodiment, such as MBS session information/MBS session context information, cast type, and TNL information between the UPF and the source base station.

As another example, the source base station may transmit a message instructing/requesting to establish/modify a unicast session (e.g., PDU session) associated with the MBS session to the AMF/SMF. The AMF/SMF may perform a session modification procedure by transmitting a unicast session (e.g., PDU session) modification request message associated with the MBS session to the base station.

Described below are additional operation embodiments related to reception of MBS data by the UE.

When the RRC connected UE is receiving MBS data in the multicast/broadcast in one cell, a cell switch may occur as the UE moves. In this case, the cell to which the UE hands over may not be transmitting the MBS data in the multicast/unicast scheme. Or, in this case, the cell to which the UE hands over may be a cell which does not support multicast/broadcast transmission. Or, the cell to which the UE hands over may be transmitting the MBS data in the multicast/unicast scheme.

In this case, coordination between the source base station and the target base station may be provided to minimize service suspension for the MBS data being received.

As an example, a multicast/broadcast radio bearer for a specific MBS session may be mapped to a unicast radio bearer through inter-base station coordination and configured in the UE. By so doing, the UE may receive data for the MBS session through the unicast radio bearer at (or after) a specific time. The specific time may be one of the times of reception of an RRC message including a handover command, initiation of random access to the target base station (Msg1/MsgA transmission), any first/initial uplink transmission to the target base station, successful random access to the target base station, release of the source cell, application/establishment/reconfiguration/completion of any L2 entity in the target cell, and completion of handover.

As another example, if the target base station has not established a tunnel (associated with the QoS flows of the MBS session) between the base station and the UPF associated with the MBS session in the target base station, the target base station may transmit, to the AMF/SMF, specific indication information to start the MBS session, to establish a tunnel between the target base station and the UPF for the MBS session, to instruct/request to establish/modify a unicast session (e.g., a PDU session) associated with the MBS session, or to establish/modify/change the MBS session. The AMF/SMF may perform a session establishment/modification procedure by transmitting a unicast session (e.g., PDU session) establishment/modification request message associated with the MBS session to the base station. Alternatively, the AMF/SMF may perform an MBS session start procedure for starting the corresponding MBS session to the base station.

As an example, if the target base station has established a tunnel (associated with the Qos flows of the MBS session) between the base station and the UPF associated with the MBS session, and the tunnel is associated with a multicast/broadcast (point-to-multipoint) radio bearer for multicast/broadcast (point-to-multipoint) transmission in the target cell, the multicast/broadcast radio bearer may be mapped and configured in the UE.

As an example, if the target base station has established a tunnel (associated with the Qos flows of the MBS session) between the base station and the UPF associated with the MBS session, and the tunnel is associated with a radio bearer for unicast (point-to-point) transmission in the target cell, the tunnel between the target base station and the UPF associated with the MBS session may be mapped to a new unicast (point-to-point) radio bearer for the UE and configured.

To easily perform dynamic switching in one cell for one UE, a unicast session and an MBS session may be simultaneously established. To easily perform dynamic switching during a cell switch/handover process for one UE, a unicast session and an MBS session may be established simultaneously. For specific MBS data, the UE may receive the corresponding MBS data through a unicast session or an MBS session according to a network instruction. The base station may transmit MBS data only through one of a unicast session or an MBS session at a specific time.

As the unicast session, the existing PDU session between the UE and the UPF may be used as it is or may be partially modified. For example, for a bidirectional PDU session, MBS data may be transmitted through a downlink PDU session. The UE may transmit application layer request information necessary to receive MBS data through an uplink PDU session (or through any user plane connection) or control information (e.g., IGMP, MLD, IP multicast address) for IP multicast reception to the UPF or base station. The UPF or the base station may distinguish this. For example, the UPF may distinguish the corresponding packet through packet filtering. As another example, the base station may differentiate the corresponding packet through an arbitrary uplink L2 control PDU (e.g., MAC CE, RLC control PDU, PDCP control PDU, SDAP control PDU). When the corresponding packet is detected, the UPF or the base station may use it to change/modify the unicast session and the MBS session. For example, it may be instructed to transmit the detected information to the SMF/AMF/base station or to allow the UPF to select either the unicast session or the MBS session and transmit the MBS data.

Alternatively, the UE may transmit application layer request information required to receive MBS data or control information (e.g., IGMP, MLD, IP multicast address) for IP multicast reception through any uplink signaling (or connection to any control plane). The AMF/UPF or the base station may distinguish this. For example, the AMF/SMF may receive the corresponding information through NAS signaling. As another example, the base station may receive the corresponding information through any uplink RRC message. When the corresponding information is detected, the AMF/SMF or the base station may use it to establish/change/modify the unicast session and the MBS session. For example, the SMF/AMF may instruct to transmit the detected information to the base station or to allow the UPF to select either the unicast session or the MBS session and transmit the MBS data.

The UPF may support a first hop router function to support IP multicast transmission. The IGMP (Internet Group Management Protocol for IPv4) or MLD (Multicast Listener Discovery for IPv6) may be used for group management for the MBS session identified by the IP multicast address. For example, the UPF may detect the IGMP packet and receive membership/join information for the UE's MBS session. For example, information for membership/joining the multicast group may be obtained. As an example, information for leaving the multicast group may be obtained. As another example, the UPF may transmit an IGMP Query message to the UE to thereby receive a report on the membership/join/leave for the multicast session from the UE. As another example, when there is no IGMP report periodically received, the UPF may be aware that the UE has left the multicast group. To that end, the MBS session may be configured to have a unicast uplink session.

The unicast session may be configured as a dedicated PDU session that is mapped one-to-one to the MBS session. Alternatively, the unicast session may be configured as a dedicated PDU session mapped one-to-many/many-to-one to one or more MBS sessions. Or, the unicast session may be not released but established and maintained under a specific condition (e.g., when the UE is interested in the MBS session, when the UE transmits any uplink indication information/message for the MBS session to the base station or the network, or when the UE is receiving the MBS session). The condition may be applied to one UE or may be applied cell-specifically. Or, the radio bearer may be mapped one-to-many/many-to-one to one or more MBS sessions.

To that end, the message included in the PDU session establishment procedure (e.g., PDU Session Establishment Request between the UE and the AMF, PDU SESSION RESOURCE SETUP REQUEST between the base station and the AMF, PDU SESSION RESOURCE SETUP RESPONSE, Nsmf_PDUSession_CreateSMContex Request between AMF and SMF, Nsmf_PDUSession_CreateSMContex Response, or such PDU session establishment procedure-related message) may include at least one of information for identifying the associated MBS session (MBS service ID, MBS session ID, TMGI, session-ID), TNL information (e.g. IP address for the downlink tunnel between AMF and base station, GTP TEID), QOS flow information, session/cast type (information for differentiating one or more of the multicast session, broadcast session, and unicast session) and MBS session type (information for differentiating one or more of IPv4, IPv6, IPv4IPv6, ethernet, and unstructured) information.

The MBS session may use the above-described MBS session start procedure (e.g., MBS session start request/response message).

The target base station prepares for a handover having an L1/L2 configuration. The target base station may perform accept control on the received MBS session/MBS context.

As an example, the target base station may determine whether to accept transmission in any transmission scheme/cast type (e.g., multicast/broadcast (point-to-multipoint) transmission, unicast (point-to-point) transmission) for the corresponding MBS session requested by the source base station for the corresponding UE. As another example, the target base station may determine a transmission scheme/cast type (e.g., multicast/broadcast transmission, unicast transmission) for the corresponding MBS session requested by the source base station for the corresponding UE. As another example, the target base station may indicate to the source base station a transmission scheme/cast type for the corresponding MBS session requested by the source base station for the corresponding UE. As another example, if the target base station is performing multicast/broadcast transmission for the corresponding MBS session, the target base station may indicate to the source base station that multicast/broadcast transmission is performed for the corresponding MBS session. As an example, the source base station and the target base station may exchange any MBS session-related information, such as transmission scheme/cast type (e.g., multicast/broadcast transmission or unicast transmission), session start time, end time, or cell identification information, for the MBS sessions through an Xn interface message between the base stations. To that end, the source base station and the target base station may request information between the base stations and receive a response or may transfer the same to the neighbor base station according to a specific trigger condition.

As another example, the target base station may transmit the accepted MBS session resource information (MBS Session Resource Admitted List) to the source base station. The information may include one or more of the MBS session identification information, MBS session context information, TNL information, accepted QoS flow information, and target base station data forwarding information (e.g., DL data forwarding GTP-TEID). As another example, the information may be transmitted from the target base station to the source base station through a handover request acknowledge (HANDOVER REQUEST ACKNOWLEDGE) message.

As another example, the source base station may transfer the transmission scheme/cast type (e.g., multicast/broadcast transmission or unicast transmission) information for the MBS session for the UE to the target base station. As an example, the source base station may transfer configuration information for the MBS session for the UE to the target base station.

The source base station may transfer unicast session information associated with the MBS session, along therewith, to the target base station. Therefore, upon moving from the multicast/broadcast transmission cell to the unicast transmission cell, the target base station may configure DRB(s) according to the unicast session information. Thereby, an MBS data flow may be mapped to the DRB(s) through the unicast target cell and configured. Or, a DRB according to the unicast session information may be configured in the target cell to which the UE unicast hands over, thereby providing a service through the DRB(s) for providing a unicast session associated with the MBS session.

The source base station may propose/request data forwarding for the QoS flow of each MBS session through the above-described handover request message. When the target base station accepts data forwarding for at least one QoS flow for the MBS session, the target base station may include and transmit the downlink TNL information on the QoS flow which belongs to the MBS session through a handover request acknowledge (HANDOVER REQUEST ACKNOWLEDGE) message.

If the MBS radio bearer is configured without a PDCP entity, the packets of the QoS flow belonging to the corresponding MBS session may be forwarded through the DL (MBS radio bearer) forwarding tunnel mapped as RLC SDUs.

The source base station may receive a GTP-U end marker for the corresponding MBS session from the UPF (or MBS UPF). When data for any more MBS sessions is not forwarded through the tunnel, the source base station may transmit (replicate) the end marker through each data forwarding tunnel. This may be performed as the source base station performs a procedure (which is described below) for transmitting a message for instructing/requesting to modify/release the DL tunnel between the base station and the UPF associated with the MBS session to the AMF/SMF.

A unidirectional UM mode RLC entity without PDCP may be used to perform multicast/broadcast data transmission on the air interface between the base station and the UE. Even when unicast transmission is performed on the MBS session, the SDAP entity may be directly associated to the RLC entity, without PDCP. For the UE to receive data, the base station may indicate to the UE configuration information.

As another example, a unidirectional UM mode RLC entity including a PDCP may be used to perform multicast/broadcast data transmission on the radio interface between the base station and the UE. When performing unicast transmission on the MBS session, the SDAP may be associated with the PDCP entity and the PDCP entity may be associated with the RLC entity.

As another example, an AM mode RLC entity including a PDCP may be used to perform multicast/broadcast data transmission on the radio interface between the base station and the UE. When performing unicast transmission on the MBS session, the SDAP may be associated with the PDCP entity and the PDCP entity may be associated with the RLC entity.

Figure 12:
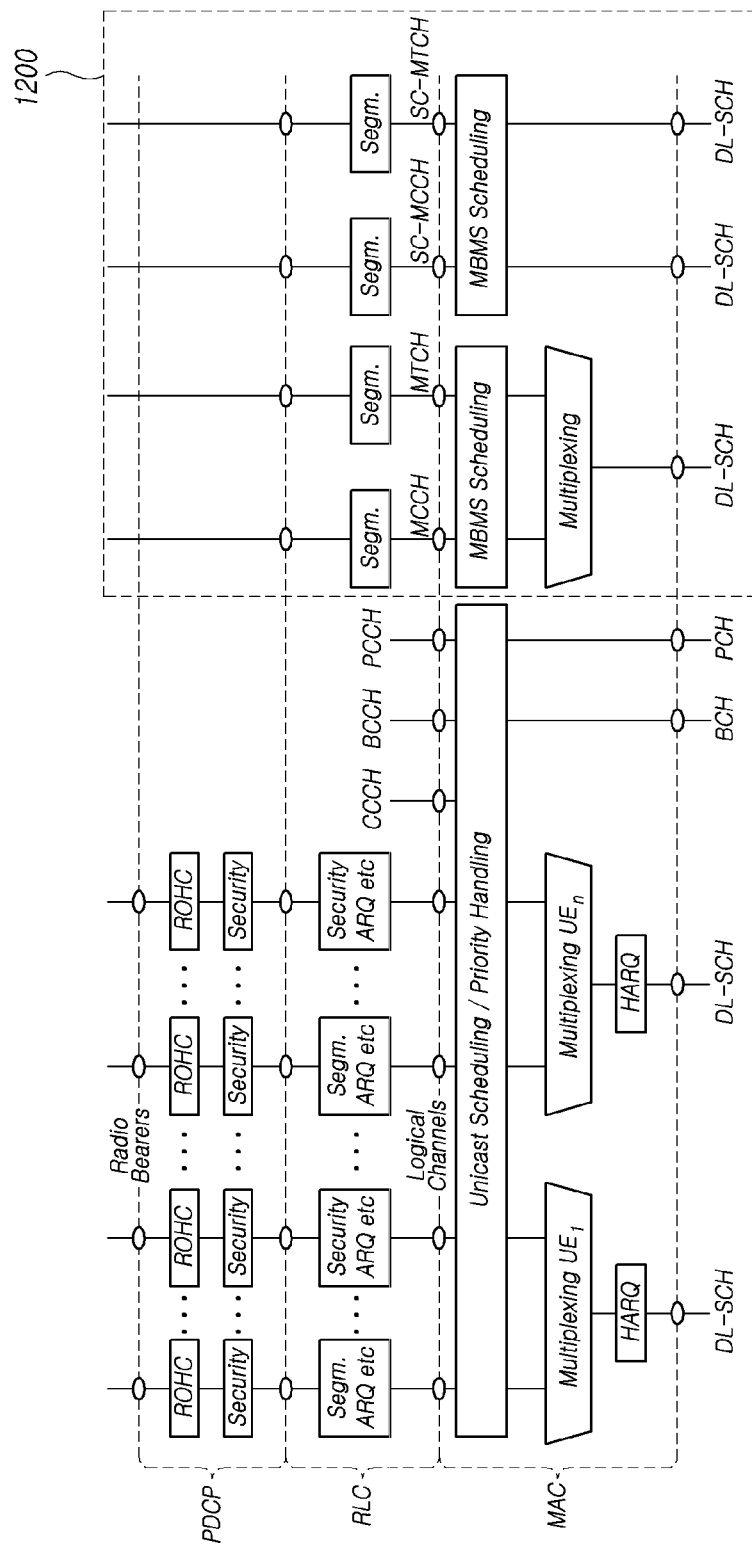
FIG. 12 is a view illustrating a structure of a downlink layer 2 in an LTE system.

FIG. 12 is a view illustrating a structure of a downlink layer 2 in an LTE system.

Referring to FIG. 12, as in the structure 1200, the MBMS point to multipoint radio bearer (MRB) or SC-MRB for providing MBMS in the typical LTE transmits data based on the RLC-UM providing a segmentation function without PDCP entity. The LTE base station was able to distinguish payload/data belonging to the MBMS session through the transport network layer (TNL) information and MBMS session transmitted through the MBMS session start request message. For example, the information on the MBMS session may include one or more of TMGI, MBMS session-ID, and MBMS service area. Here, the MBMS service area information may include an MBMS service area identity (MBMS Service Area Identity (SAI)). The MBMS SAI consists of 2 octets, is coded, and is used to identify a group of cells in one PLMN. This is independent of physical cell and location/routing area. One cell may belong to one or more MBMS service areas. Therefore, it may be addressed by one or more MBMS service area identities (SAIs).

The TNL information may include at least one of an IP multicast address, an IP source address, and a GTP DL TEID. The LTE base station distinguishes the data belonging to the MBMS session through the TNL information and transmitted the same in association with a corresponding MBMS radio bearer (or RLC-UM entity).

To transmit MBS data (e.g., media, video, software downloading, etc.), an MBS session needs to be established between the UE and the core network entity. NR supports flow-based QoS processing for general user data. Therefore, it is desirable to support QoS granularity per flow even when MBS is provided in NR. Thus, the MBS session start request message transmitted from the core network control plane entity (e.g., AMF) to the base station may include QoS flow setup request information in addition to the MBS session and transport network layer (TNL) information.

The base station may receive a session start request message for a specific MBS session through any core network control plane entity (e.g., AMF). For example, the message may include identification information for the MBS service (or MBS session) (for ease of description, this is referred to below as identification information for MBS session. However, this is merely for ease of description, the term may be replaced with, e.g., MBS service ID, MBS session ID, TMGI, session-ID, IP multicast address, or any other similar conventional identification information or other new terms) and QoS information for the MBS session (e.g., one or more of 5QI/QCI, QOS flow Identifier, GBR QOS flow information (Maximum Flow Bit Rate, Guaranteed Flow Bit Rate, Maximum Packet Loss Rate), Allocation and Retention Priority, Priority Level Packet Delay Budget, Packet Error Rate information).

To limit the maximum transmission rate of the UE, the Aggregate Maximum Bit Rate (UE-AMBR) or PDU Session AMBR was typically used. Each PDU session of one UE could be limited in transmission rate through Session-AMBR, which is an aggregate rate limit Qos parameter for each session, and each UE may be limited its transmission rate through Session-AMBR, which is an aggregate rate limit QoS parameter for each UE. Thus, the base station was set with the sum of the Session-AMBRs of all the PDU sessions having an active user plane up to the UE-AMBR value received from the AMF (Each (R)AN shall set its UE-AMBR to the sum of the Session-AMBR of all PDU Sessions with active user plane to this (R)AN up to the value of the received UE-AMBR from AMF). In the related art, UE-AMBR and Session-AMBR were applied in both directions (uplink and downlink directions). Session-AMBR was not applied to the GBR QOS flow. For downlink traffic, the UPF performed Session-AMBR execution (refer to 3GPP TS 23.501). For uplink traffic, the UE and UPF performed Session-AMBR execution.

Unlike the typical maximum transmission rate limitation, the operator may newly define information for limiting the maximum transmission rate of an MBS session and signal it.

As an example, the MBS session may be provided with a GBR QOS flow. As another example, the MBS session may be provided with a non-GBR QOS flow. As another example, the operator may define and signal an aggregate rate limit QoS parameter per session for an MBS session. As another example, the operator may define and signal an aggregate rate limit QoS parameter (e.g., UE-MBS_Sessions-AMBR) of an MBS session for each UE for an MBS session. The aggregate rate limit QoS parameter of the MBS session for each UE may be set to a value equal to or smaller than the UE-AMBR. As another example, the above-described parameters may be applied only to the downlink direction. As another example, the UE-AMBR may be set as the sum of Session-AMBRs of all (unicast) PDU sessions having an active user plane except for the MBS session. As another example, the UE-AMBR may be set as the sum of Session-AMBRs of all (unicast/multicast/broadcast) sessions having an active user plane including an MBS session. The above-described parameter may be signaled from AMF/SMF to the base station, from AMF/SMF to the UE, or from AMF/SMF to the UPF. The signaling message may mean a signaling message on known standards (e.g. any PDU session establishment procedure-related message, such as PDU Session Establishment Request between UE and AMF or between base station and AMF, PDU SESSION RESOURCE SETUP REQUEST, PDU SESSION RESOURCE SETUP RESPONSE, Nsmf_PDUSession_CreateSMContex Request between AMF and SMF, Nsmf_PDUSession_CreateSMContex Response).

Unlike LTE, which has applied MBMS technology to terrestrial broadcasting services or specific applications, NR is required to support MBS in various vertical domains. To that end, it is necessary to support MBS supporting various requirements. For example, it may be desired to provide MBS for V2X/public safety/industrial IoT services through a short-range network/internally/through a non-public network/private network. For example, a file transmission for software upgrade for a specific IoT UE group may be provided through an MBS session. As another example, it may be desired to provide transmission of an emergency message through an MBS session.

Various MBS services may provide transmissions distinguished through QOS flow request information. However, it was not possible to separately control detailed items, e.g., the start time of the MBS session, the stop time of the MBS session, the duration of the MBS session, and the repetition of the MBS session. Therefore, the MBS session start request message received by the base station may include one or more of the MBS session start time, the MBS session stop time, the duration of the MBS session, the number of MBS session repetitions, and the MBS session repetition period. Here, the MBS session start time may indicate the time when MBS data starts to be transmitted from the base station/network through the MBS radio bearer. The MBS session stop time may indicate the time when MBS transmission is expected to be completed. The duration of the MBS session may indicate the period of transmission of the MBS data. The number of MBS session repetitions may indicate the number of times that MBS data transmission is repeated, and the MBS session repetition period may indicate the period in which the MBS data transmission is repeated. If the information is not included, MBS data is transmitted immediately or is expected to be transmitted immediately. Further, it is stopped, or is expected to be stopped, by a message instructing to stop the session.

The base station may calculate/convert into scheduling information for MBS data transmission by the base station using or based on the received information. The base station may transmit the corresponding information through system information or logical channel information (e.g., MCCH, SC-MCCH) for MBS transmission. For example, the corresponding time information may be associated/mapped/converted to UTC (Coordinated Universal Time) and indicated by the base station through system information (e.g., SIB9). The time information may be indicated through offset time information with UTC time information (timeInfoUTC) corresponding to the SFN boundary or immediately after the end boundary of the SI-window through which SIB9 is transmitted. As another example, the corresponding time information may be associated/mapped/converted to the SFN and indicated. It may be indicated through one or more of the start SFN, the repeated start SFN list, the start offset/frame/slot/subframe/time point, the duration/duration/length, the repetition period, and the repetition count. Through this, the UE may obtain scheduling information in which MBS data is transmitted in units of PDCCH slots. As another example, to reduce power consumption, scheduling information for instructing to perform PDCCH monitoring discontinuously for a corresponding specific RNTI may be indicated. The scheduling information may be a parameter for DRX reception and may include one or more of an on-duration timer, an in-activity timer, a scheduling period, and a scheduling offset.

As another example, the MBS session start request message may directly include cell identification information to provide the MBS service area. Typically, MBMS requested to start a session by coding (e.g., SAI) a designated service area and including the corresponding code (SAI) information. To provide a flexible MBS service by reusing the 5G system as possible, it is preferable to dynamically designate a specific cell group to thereby enable an MBS session to start. For example, similar to a paging message, it may be configured to include cell identification information to directly provide MBS transmission. To that end, the MBS session start request message may include cell information/cell list information for the corresponding base station to transmit MBS data. The cell/cell list information may include one or more of physical cell identifier information, NR cell global identifier (NR CGI, used to globally identify an NR cell), E-UTRA CGI, gNB ID, PLMN Identity, and NR Cell Identity (NCI).

As another example, the MBS session start request message may include information for differentiating the type of MBS session (or cast type, e.g., one-bit information for differentiating multicast/broadcast or two-bit information for differentiating multicast/broadcast/unicast) or information for indicating the type of MBS session. This allows the base station to perform appropriate MBS transmission in the wireless network by considering/differentiating the MBS session type.

As another example, the MBS session start request message may include information on the number of UEs expected/predicted to join the corresponding MBS session (receive MBS). As another example, the response message to the MBS session start request message may include information on the number of UEs that actually joined the MBS session (MBS reception) to the corresponding base station. This allows the base station to perform appropriate MBS transmission in the wireless network by considering/differentiating the MBS session type. For example, the MBS session may be transmitted in association with an MBS (point-to-multipoint) radio bearer. Alternatively, the MBS session may be transmitted in association with a unicast (point-to-point) radio bearer (DRB). To that end, the core network entity (e.g., one of AMF, SMF, UPF, and MBS Function) may count information on the number of UEs that requested to join/receive/have interest in the corresponding MBS session.

For this purpose, an example of counting UE number information through UPF will be described below.

The IGMP (Internet Group Management Protocol for IPv4) or MLD (Multicast Listener Discovery for IPv6) may be used for group management for the MBS session identified by the IP multicast address. An MBS session may be established between the UE and the UPF. To that end, the UPF needs to be able to receive configuration information for the MBS session from the AMF/SMF. The UPF may transmit the corresponding MBS flow to the base station through packet filtering for the MBS flow. The UPF may support a first hop router function to support IP multicast transmission. For example, the UPF may detect the IGMP packet and receive membership/join information for the UE's MBS session. For example, information for membership/joining the multicast group may be obtained. As an example, information for leaving the multicast group may be obtained. As another example, the UPF may transmit an IGMP Query message to the UE to thereby receive a report on the membership/join/leave for the multicast session from the UE. As another example, when there is no IGMP report periodically received, the UPF may be aware that the UE has left the multicast group. To that end, as an example, it may be rendered to have a unicast uplink session associated with the MBS session.

As another example, a PDU session for an MBS session (or a PDU session associated with an MBS session or a unicast PDU session associated with an MBS session) may be established between the UE and the UPF. This may be provided through a normal PDU session establishment procedure. The message included in the PDU session establishment procedure (e.g., any PDU session establishment procedure-related message, such as PDU Session Establishment Request between the UE and the AMF, PDU SESSION RESOURCE SETUP REQUEST between the base station and the AMF, PDU SESSION RESOURCE SETUP RESPONSE, Nsmf_PDUSession_CreateSMContex Request between the AMF and the SMF, or Nsmf_PDUSession_CreateSMContex Response) may include one or more of information for identifying the associated MBS session (MBS service ID, MBS session ID, TMGI, session-ID, IP multicast address), TNL information, QoS flow information, and session type (information for differentiating one or more of a multicast session, broadcast session, and PDU session.

As another example, one PDU session may be configured in association with one unicast PDU session and the other with an MBS session at the same time.

In the typical LTE technology, one MBSM session was mapped to one MBMS Point to Multipoint Radio Bearer (MRB)/Single Cell MRB (SC-MRB). For example, when establishing an MRB to start one MBMS session, the UE established one RLC entity according to the default configuration, configured an MTCH logical channel according to the logical channel identification information (locgicalChannelIdentity) included in the MBSFNAreaConfiguration (MCCH) message, and configured one MRB. As another example, when configuring an SC-MRB to start one MBMS session, the UE established one RLC entity according to the default configuration and configured one SC-MRB according to the g-RNTI and scheduling information (sc-mtch-SchedulingInfo) included in the SCPTMConfiguration (SC-MCCH) message. Accordingly, the SC-MCCH or SC-MTCH is fixed to one designated logical channel identity (LCID 11001).

NR provides flow-based QoS. Therefore, when applying the MBS session in NR, it is desirable to provide separate processing in units of flows.

For example, one MBS session may include one or more QoS flows having different Qos characteristics. To that end, the base station may associate the above-described identification information for the MBS session and one or more QoS flows mapped to the MBS session to one or more radio bearers. For convenience of description, a radio bearer associated with an MBS session is denoted as an MBS radio bearer. For example, assume that one MBS session has three different flows (QFI1, QFI2, QFI2) and is associated with two MBS radio bearers (MBS-RB1, MBS-RB2). For example, one Service Data Adaptation Protocol (SDAP) entity may be configured for each MBS session, and the QoS flow may be mapped to the MBS radio bearer.

FIG. 13 is a view illustrating MBS radio bearer configuration information according to an embodiment.

FIG. 13 illustrates an example of MBS session configuration information for instructing to map QFI1 and QF2 to MBS-RB1 and QF3 to MBS-RB2. If the MBS-RB is configured without a PDCP entity, the PDCP-Config included in the MBS-RB configuration information of FIG. 13 may be deleted. Alternatively, in FIG. 13, the PDCP-Config included in the MBS-RB configuration information may be deleted and an RLC-BearerConfig may be included. Alternatively, a mode for transparently transmitting PDCP may be defined and configured. The corresponding mode may be transmitted without a PDCP header. The corresponding mode may be rendered not to perform the PDCP function (e.g., ROHC, Security).

FIG. 14 is a view illustrating MBS radio bearer configuration information according to another embodiment.

Referring to FIG. 14, one Service Data Adaptation Protocol (SDAP) entity may be configured for all MBS sessions (e.g., for all MBS sessions associated with one base station or all MBS sessions associated with one UE) so that the QoS flow may be mapped to the MBS radio bearer. Since MBS sessions may be configured cell-specifically, one SDAP may be configured and provided for all MBS sessions. Accordingly, as illustrated in FIG. 14, MBS session configuration information for instructing to map QFI1 and QF2 to MBS-RB1 and QFI3 to MBS-RB2 may be configured.

The UE may designate and use a specific RNTI (e.g., M-RNTI, SC-RNTI, or G-RNTI of the conventional LTE technology) for MBS data reception.

For example, the UE may use an RNTI capable of receiving data by multiplexing a plurality of MBS sessions (e.g., one cell-specific RNTI for the entire corresponding service like M-RNTI). If an RNTI capable of receiving data by multiplexing multiple MBS sessions (e.g., one cell-specific RNTI for the entire service like RNTI) is used, one or more QoS flows belonging to different MBS sessions may be mapped to one radio bearer having the same Qos characteristics, and transmitted. One radio bearer having the same QoS characteristics may be associated with one or more MBS sessions. For example, the PDCP entity/RLC entity/logical channel identification information may be associated with one or more MBS session information. For example, the UE may differentiate and process the MBS session through MBS session identification information and QFI (information for identifying QoS flows in one MBS session).

As another example, the UE may use an RNTI (e.g., SC-RNTI, a session-specific RNTI similar to G-RNTI) capable of receiving data distinctively for each MBS session. If an RNTI (e.g., SC-RNTI, similar to G-RNTI) capable of receiving data distinctively per session is used, one or more QoS flows belonging to different MBS sessions, albeit having the same QoS characteristics, may not be mapped to one radio bearer and transmitted. One or more QoS flows belonging to one MBS session may be mapped to one radio bearer having the same Qos characteristics and transmitted. One or more QoS flows belonging to one MBS session may be mapped to their respective corresponding radio bearers having different QoS characteristics and transmitted. For example, the PDCP entity/RLC entity/logical channel identification information may be associated with one MBS session information. For example, the UE may differentiate and process MBS sessions through the association information between SDAP configuration information (e.g., QFI (information for identifying QoS flow in one MBS session)) and PDCP entity/RLC entity/logical channel identification information.

To that end, MBS radio bearer identification information/ RLC radio bearer/logical channel identification information associated with each QoS flow associated with each MBS session may be indicated to the UE by the base station. Accordingly, as an example, the control logical channel (e.g., MBS Control Channel) and/or a traffic logical channel (e.g., MBS Traffic Channel) included in the same MBS session may be multiplexed with other logical channels included in the same MBS session within the same MAC PDU. As another example, the control logical channel (e.g., MBS Control Channel) and/or a traffic logical channel (e.g., MBS Traffic Channel) included in the same MBS session may be multiplexed with other logical channels within the same MAC PDU. As another example, the control logical channel (e.g., MBS Control Channel) and/or traffic logical channel (e.g., MBS Traffic Channel) included in the same MBS session may be multiplexed with the control logical channels (e.g., MBS Control Channel) and/or traffic logical channel (e.g., MBS Traffic Channel) included in different MBS sessions within the same MAC PDU.

Figure 15:
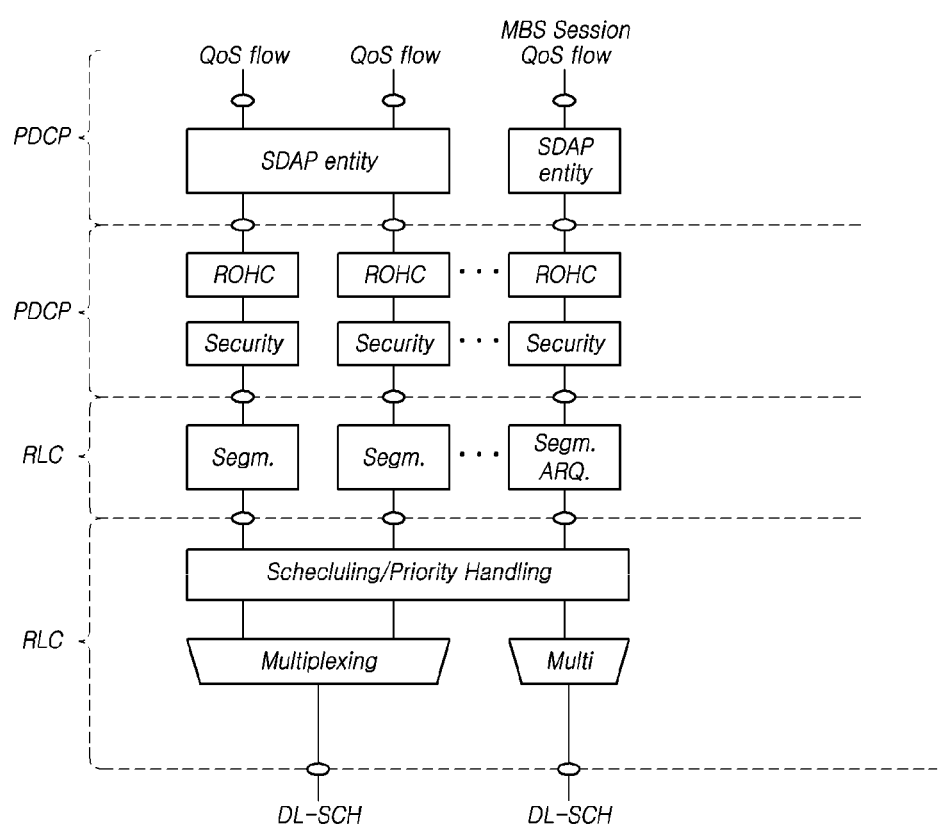
FIG. 15 is a view illustrating a layer 2 structure according to an embodiment.

FIG. 15 is a view illustrating a layer 2 structure according to an embodiment.

Referring to FIG. 15, rather than including a multiplexing entity for each MBS session, one multiplexing entity may be included for two MBS sessions (or all MBS sessions) in processing data.

In providing an MBS service, the more users who receive the corresponding MBS session are within the coverage of one cell, the higher the transmission efficiency of MBS session delivery may be. In contrast, as the number of users receiving the MBS session within the cell coverage reduces, the transmission efficiency may be decreased. For example, the MBS session may be intended for supporting data reception by multiple users, ending up with decreased wireless transmission efficiency as compared with unicast-based transmission. Therefore, if the network is able to dynamically switch/change multicast/broadcast transmissions and unicast transmission for one MBS data, the efficiency of wireless transmission may be increased.

As such, if it is intended to support dynamic switching between unicast transmission and multicast/broadcast transmission in transmitting MBS data, a need may arise for a procedure for modifying/switching from unicast transmission to multicast/broadcast transmission or from multicast/ broadcast transmission to unicast transmission so as to transmit the MBS data.

For example, a unicast session and an MBS session may be configured as dual. To facilitate dynamic switching, a unicast session and an MBS session may be simultaneously established. For specific MBS data, the UE may receive the corresponding MBS data through a unicast session or an MBS session according to a network instruction. The base station may transmit MBS data only through one of a unicast session or an MBS session at a specific time.

As the unicast session, the existing PDU session between the UE and the UPF may be used as it is or may be partially modified. For example, for a bidirectional PDU session, MBS data may be transmitted through a downlink PDU session. The UE may transmit application layer request information necessary to receive MBS data through an uplink PDU session (or through any user plane connection) or control information (e.g., IGMP, MLD, IP multicast address) for IP multicast reception to the UPF or base station. The UPF or the base station may distinguish this. For example, the UPF may distinguish the corresponding packet through packet filtering. As another example, the base station may differentiate the corresponding packet through an arbitrary uplink L2 control PDU (e.g., MAC CE, RLC control PDU, PDCP control PDU, SDAP control PDU). When the corresponding packet is detected, the UPF or the base station may use it to change/modify the unicast session and the MBS session. For example, it may be instructed to transmit the detected information to the SMF/AMF/base station or to allow the UPF to select either the unicast session or the MBS session and transmit the MBS data.

Alternatively, the UE may transmit application layer request information required to receive MBS data or control information (e.g., IGMP, MLD, IP multicast address) for IP multicast reception through any uplink signaling (or connection to any control plane). The AMF/UPF or the base station may distinguish this. For example, the AMF/SMF may receive the corresponding information through NAS signaling. As another example, the base station may receive the corresponding information through any uplink RRC message. When the corresponding information is detected, the AMF/SMF or the base station may use it to switch/modify the unicast session and the MBS session. For example, the SMF/AMF may instruct to transmit the detected information to the base station or to allow the UPF to select either the unicast session or the MBS session and transmit the MBS data. The UPF may support a first hop router function to support IP multicast transmission. For example, the UPF may detect the IGMP packet and receive membership/join information for the UE's MBS session. For example, information for membership/joining the multicast group may be obtained. As an example, information for leaving the multicast group may be obtained. As another example, the UPF may transmit an IGMP Query message to the UE to thereby receive a report on the membership/join/leave for the multicast session from the UE. As another example, when there is no IGMP report periodically received, the UPF may be aware that the UE has left the multicast group. To that end, as an example, it may be rendered to have a unicast uplink session associated with the MBS session.

The unicast session may be configured as a dedicated PDU session that is mapped one-to-one to the MBS session. Alternatively, the unicast session may be configured as a dedicated PDU session mapped one-to-many to one or more MBS sessions. Or, the unicast session may be not released but established and maintained under a specific condition (e.g., when the UE is interested in the MBS session, when the UE transmits any uplink indication information/message for the MBS session to the base station or the network, or when the UE is receiving the MBS session).

To that end, the message included in the PDU session establishment procedure (e.g., PDU Session Establishment Request between the UE and the AMF, PDU SESSION RESOURCE SETUP REQUEST between the base station and the AMF, PDU SESSION RESOURCE SETUP RESPONSE, Nsmf_PDUSession_CreateSMContex Request between AMF and SMF, Nsmf_PDUSession_CreateSMContex Response, or such PDU session establishment procedure-related message) may include at least one of information for identifying the associated MBS session (MBS service ID, MBS session ID, TMGI, session-ID), TNL information (e.g. IP address for the downlink tunnel between AMF and base station, GTP TEID), QOS flow information, session/cast type (information for differentiating one or more of the multicast session, broadcast session, and unicast session) and MBS session type (information for differentiating one or more of IPv4, IPv6, IPv4IPv6, ethernet, and unstructured) information. The MBS session may use the above-described MBS session start procedure (e.g., MBS session start request/response message).

As another example, one unicast session may be modified/changed/switched into one MBS session according to a request of the base station/network/UE. Alternatively, one MBS session may be modified/changed/switched into one unicast session according to a request of the base station/network/UE. When the modification/change/switching between sessions is performed, the previous session may be released and a new session may be established. Alternatively, when modification/change/switching between sessions is performed, a new session may be established first, and then the previous session may be released.

For example, when a procedure for establishing a new session is completed, the base station/network/UE may initiate a procedure for releasing the previous session.

The MBS session between the UPF and the base station may have one or more QoS flows. Each corresponding flow or one flow may have associated UP Transport layer information. This is information on the downlink tunnel between the UPF and the base station and may include the IP address and GTP-TEID of the base station. The base station maps the QoS flow identification information to the MBS radio bearer and transmits data. In this case, the base station may select unicast transmission or MBS transmission according to the decision of the base station or information determined and indicated by the core network entity.

In transmitting MBS data to a specific UE, significant overhead may be caused by use of different tunnels between the UPF and the base station when the network determines unicast transmission so that data is transmitted via unicast transmission and when the network determines MBS transmission so that data is transmitted the MBS session. Therefore, even when data is transmitted through a unicast session, it is preferable to transmit data by sharing the tunnel for transmission to the base station through the MBS session (the downlink tunnel between the UPF and the base station or the downlink tunnel between the MBS user plane function and the base station). Accordingly, one or more UEs may be rendered to share and use the tunnel for transmission to the base station through the MBS session (the downlink tunnel between the UPF and the base station or the downlink tunnel between the MBS user plane function and the base station). To that end, when establishing/modifying a unicast PDU session for the UE, it is possible to perform transmission, with indication information for sharing the N3 tunnel between the base station and UPF of the MBS session included. For example, the message included in the PDU session establishment/modification procedure (e.g., PDU Session Establishment Request between the UE and the AMF, PDU SESSION RESOURCE SETUP REQUEST between the base station and the AMF, PDU SESSION RESOURCE SETUP RESPONSE, Nsmf_PDUSession_CreateSMContex Request between AMF and SMF, Nsmf_PDUSession_CreateSMContex Response, or such PDU session establishment procedure-related message) may include at least one of information for identifying the associated MBS session (MBS service ID, MBS session ID, TMGI, session-ID, IP multicast address), TNL information for the shared tunnel (e.g. IP address for the downlink tunnel between AMF and base station, GTP TEID), QOS flow information, session/cast type (information for differentiating one or more of the multicast session, broadcast session, and unicast session) and MBS session type (information for differentiating one or more of IPv4, IPv6, IPv4IPv6, ethernet, and unstructured) information.

An MBS session may be established between the UE and the UPF. To that end, the UPF needs to be able to receive configuration information for the MBS session from the AMF/SMF. The UPF may transmit the corresponding MBS flow to the base station through packet filtering for the MBS flow. The UPF may support a first hop router function to support IP multicast transmission. For example, the UPF may detect the IGMP packet and receive membership/join information for the UE's MBS session. For example, information for membership/joining the multicast group may be obtained. As another example, information for leaving the multicast group may be obtained. As another example, the UPF may transmit an IGMP Query message to the UE to thereby receive a report on the membership/join/leave for the multicast session from the UE. As another example, when there is no IGMP report periodically received, the UPF may be aware that the UE has left the multicast group.

To that end, as an example, it may be rendered to have a unicast uplink session associated with the MBS session. As another example, a PDU session for an MBS session (or a PDU session associated with an MBS session or a unicast PDU session associated with an MBS session) may be established between the UE and the UPF. This may be provided through a normal PDU session establishment procedure. The message included in the PDU session establishment procedure (e.g., any PDU session establishment procedure-related message, such as PDU Session Establishment Request between the UE and the AMF or between the base station and AMF, PDU SESSION RESOURCE SETUP REQUEST between the base station and the AMF, PDU SESSION RESOURCE SETUP RESPONSE, Nsmf_PDUSession_CreateSMContex Request between the AMF and the SMF, or Nsmf_PDUSession_CreateSMContex Response) may include one or more of information for identifying the associated MBS session (MBS service ID, MBS session ID, TMGI, session-ID), TNL information, QoS flow information, and session type (information for differentiating one or more of a multicast session, broadcast session, and PDU session.

As another example, one PDU session may be configured in association with one unicast PDU session and the other with an MBS session at the same time. The MBS session may support an Ethernet-type MBS session or PDU session. When receiving a join message/leave message, the UPF may transmit the message to the base station, include it in the UE context of the UE, and store the same.

As described above, the embodiments in the present disclosure may allow the RRC connected UE, which is receiving an MBS service, to effectively hand over through coordination between base stations.

A UE and target base station capable of performing all or some of the above-described embodiments will be described below with reference to the accompanying drawings.

Figure 16:
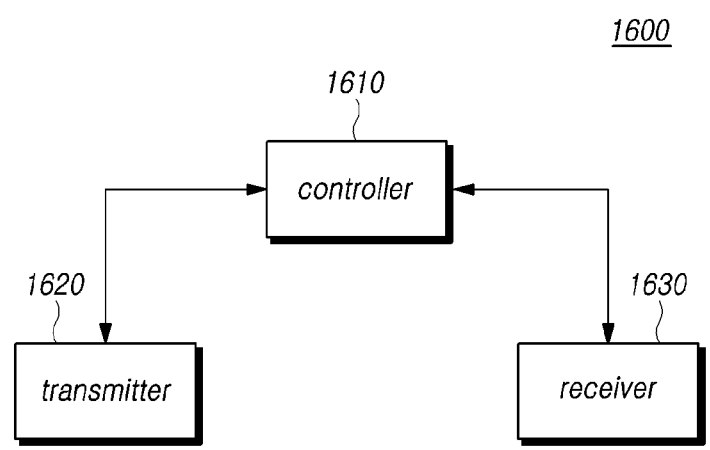
FIG. 16 is a block diagram illustrating a UE according to an embodiment.

FIG. 16 is a block diagram illustrating a UE according to an embodiment.

Referring to FIG. 16, a UE 1600 receiving Multicast/Broadcast Service (MBS) data may include a receiver 1630 and a controller 1610. that the receiver 1630, when handover is determined, receives, through a source base station, radio bearer configuration information for receiving MBS session data through a target base station. The controller 1610 configures a radio bearer for receiving MBS shared data through the target base station based on the radio bearer configuration information.

The receiver 1630 further receives MBS session data through the radio bearer. The radio bearer configuration information is information generated by the target base station and transmitted to the source base station.

Meanwhile, the source base station may transmit a handover request message to the target base station. The handover request message may be various types of messages. For example, the handover request message may be a handover preparation request message. For example, the handover request message may include at least one of MBS session context information and PDU session context information associated with the MBS session. The target base station identifies whether the target base station configures a corresponding MBS session context using the information received from the source base station.

As an example, when an MBS session context for MBS session data is not configured, the target base station transmits a message for requesting MBS session setup to the core network access and mobility management function (AMF) entity. Thereafter, the target base station receives a message to start an MBS session from the AMF entity. Therefore, the target base station may generate radio bearer configuration information.

As another example, when no MBS session context for MBS session data is configured, the target base station may generate radio bearer configuration information using PDU session context information associated with the MBS session for MBS session data.

Besides, the target base station may determine a transmission type for MBS session data. Further, the target base station may transmit a path switch request message requesting to switch the path of MBS session data to the core network access and mobility management function (AMF) entity. For example, the path switch request message may include MBS session context information.

Upon receiving the radio bearer configuration information from the source base station, the controller 1610 configures the same in the UE.

Further, the receiver 1630 may receive MBS session data through a radio bearer mapped to the MBS session. As an example, the MBS session associated with MBS session data transmission and the radio bearer may be 1:N mapped. As another example, the MBS session associated with the MBS session data transmission and the radio bearer may be N:1 mapped and configured. Here, N is a natural number not less than 1. That is, one radio bearer and a plurality of MBS sessions may be mapped, or one MBS session and a plurality of radio bearers may be mapped. The radio bearer and the MBS session may be 1:1 mapped as well. For example, the radio bearer and MBS session mapping information may be included in the above-described radio bearer configuration information.

Besides, the controller 1610 controls the overall operation of the UE 1600 according to performing the handover operation and the reception of MBS data necessary to perform the above-described embodiments.

The transmitter 1620 and the receiver 1630 are used to transmit or receive signals, messages, or data necessary for performing the above-described embodiments, with the source base station, target base station, and core network entity.

Figure 17:
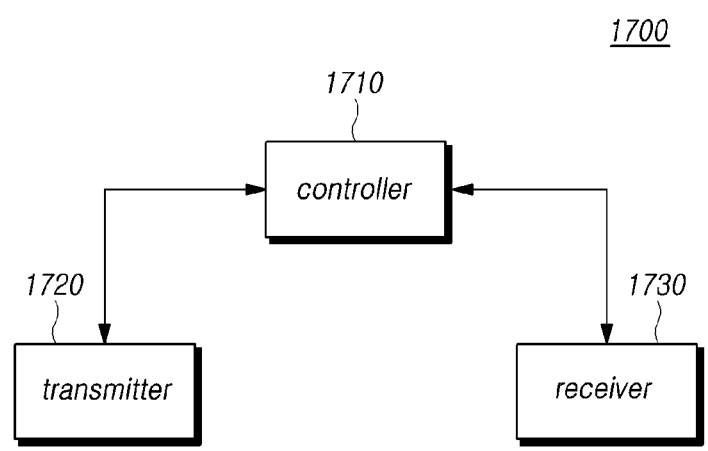
FIG. 17 is a block diagram illustrating a target base station according to an embodiment.

FIG. 17 is a block diagram illustrating a target base station according to an embodiment.

Referring to FIG. 17, a target base station 1700 controlling reception of multicast/broadcast service (MBS) data by a UE may include a receiver 1730, a controller 1710, and a transmitter 1720. The receiver 1730 receives a handover request message including at least one of MBS session context information for the UE and PDU session context information associated with an MBS session from a source base station. The controller 1710 generates radio bearer configuration information for receiving MBS session data of the UE. The transmitter 1720 transmits the radio bearer configuration information to the source base station.

The receiver 1730 may receive a handover request message from the source base station. The handover request message may be various types of messages. For example, the handover request message may be a handover preparation request message. For example, the handover preparation request message may include at least one of MBS session context information and PDU session context information associated with the MBS session.

The controller 1710 identifies whether the target base station configures a corresponding MBS session context using the information received from the source base station.

As an example, when an MBS session context for MBS session data is not configured in the target base station, the transmitter 1720 may transmit a message for requesting MBS session setup to the core network access and mobility management function (AMF) entity. The receiver 1730 may receive a message for starting an MBS session from the AMF entity.

As another example, when no MBS session context for MBS session data is configured in the target base station, the controller 1710 may generate radio bearer configuration information using PDU session context information associated with the MBS session for MBS session data.

As another example, the controller 1710 may determine a transmission type for MBS session data.

The MBS session associated with MBS session data transmission and the radio bearer may be 1:N mapped. As another example, the MBS session associated with the MBS session data transmission and the radio bearer may be N: 1 mapped and configured. Here, N is a natural number not less than 1. That is, one radio bearer and a plurality of MBS sessions may be mapped, or one MBS session and a plurality of radio bearers may be mapped. The radio bearer and the MBS session may be 1:1 mapped as well. For example, the radio bearer and MBS session mapping information may be included in the above-described radio bearer configuration information.

Further, the transmitter 1720 may transmit a path switch request message requesting to switch the path of MBS session data to the core network access and mobility management function (AMF) entity. For example, the path switch request message may include MBS session context information.

Besides, the controller 1710 controls the overall operation of the target base station 1700 according to performing the handover operation and the transmission of MBS data necessary to perform the above-described embodiments.

The transmitter 1720 and the receiver 1730 are used to transmit or receive signals, messages, or data necessary for performing the above-described embodiments, with the source base station, UE, and core network entity.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

What is claimed is:

1. A method for receiving multicast/broadcast service (MBS) by a user equipment (UE), the method comprising:
   when handover is determined, receiving, through a source base station, radio bearer configuration information for receiving MBS session data through a target base station;
   configuring a radio bearer for receiving the MBS session data through the target base station based on the radio bearer configuration information; and
   receiving the MBS session data through the radio bearer,
   wherein the radio bearer configuration information is information generated by the target base station and transmitted to the source base station,
   wherein the source base station transmits a handover request message to the target base station,
   wherein the handover request message includes MBS session ID, MBS service area identifier and QoS flow information,
   wherein the QoS flow information includes QoS flow identifier, and
   wherein the target base station, when the target base station does not support MBS transmission, generates the radio bearer configuration information using protocol data unit (PDU) session context information associated with an MBS session for the MBS session data.

2. The method of claim 1, wherein the target base station, when a tunnel between the target base station and an User Plane Function (UPF) associated with an MBS session is not established transmits a message for requesting to establish the tunnel to a core network access and mobility management function (AMF) entity.

3. The method of claim 1, wherein the source base station transmits a message for releasing a tunnel between the source base station and an User Plane Function (UPF) associated with an MBS session to a core network access and mobility management function (AMF) entity.

4. A method for controlling, by a target base station, reception of multicast/broadcast service (MBS) data by a user equipment (UE), the method comprising:
   receiving a handover request message including MBS session ID, MBS service area identifier and QoS flow information from a source base station;
   generating radio bearer configuration information for the UE to receive MBS session data; and
   transmitting the radio bearer configuration information to the source base station,
   wherein the QoS flow information includes QoS flow identifier, and
   wherein generating the radio bearer configuration information includes: when the target base station does not support MBS transmission, generating the radio bearer configuration information using PDU session context information associated with the MBS session for the MBS session data.

5. The method of claim 4, wherein generating the radio bearer configuration information includes:
   when a tunnel between the target base station and an User Plane Function (UPF) associated with an MBS session is not established,
   transmitting a message for requesting to establish the tunnel to a core network access and mobility management function (AMF) entity.

6. A user equipment (UE) receiving multicast/broadcast service (MBS) data, the UE comprising:
   a receiver configured to receive, through a source base station, radio bearer configuration information for receiving MBS session data through a target base station when handover is determined; and
   a controller configured to configure a radio bearer for receiving the MBS session data through the target base station based on the radio bearer configuration information, wherein the receiver:
   further receives the MBS session data through the radio bearer, wherein the radio bearer configuration information is information generated by the target base station and transmitted to the source base station,
   wherein the source base station transmits a handover request message to the target base station,
   wherein the handover request message includes MBS session ID, MBS service area identifier and QoS flow information,
   wherein the QoS flow information includes QoS flow identifier, and
   wherein the target base station, when the target base station does not support MBS transmission, generates the radio bearer configuration information using PDU session context information associated with an MBS session for the MBS session data.

7. The UE of claim 6, wherein the target base station, when a tunnel between the target base station and an User Plane Function (UPF) associated with an MBS session is not established, transmits a message for requesting to establish the tunnel to a core network access and mobility management function (AMF) entity.

* * * * *